(12) United States Patent
Dye et al.

(10) Patent No.: US 6,366,290 B1
(45) Date of Patent: Apr. 2, 2002

(54) DYNAMICALLY SELECTABLE TEXTURE FILTER FOR A SOFTWARE GRAPHICS ENGINE

(75) Inventors: Thomas Anthony Dye; Gautam P. Vaswani, both of Austin; Daniel P. Wilde, Cedar Park, all of TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 09/050,644

(22) Filed: Mar. 30, 1998

Related U.S. Application Data

(63) Continuation-in-part of application No. 08/831,283, filed on Mar. 31, 1997.

(51) Int. Cl.[7] .............................................. G06T 11/40
(52) U.S. Cl. ........................ 345/582; 345/606; 345/611; 345/614
(58) Field of Search ................................. 345/418, 419, 345/430, 582, 606, 611, 614

(56) References Cited

U.S. PATENT DOCUMENTS

| | | | | |
|---|---|---|---|---|
| 5,230,039 A | * | 7/1993 | Grossman et al. .......... | 345/430 |
| 5,544,292 A | * | 8/1996 | Winser ....................... | 345/430 |
| 5,760,783 A | * | 6/1998 | Migdal et al. .............. | 345/430 |
| 5,831,624 A | * | 11/1998 | Tarolli et al. ............... | 345/430 |
| 5,872,902 A | * | 2/1999 | Kuchkuda et al. .......... | 345/430 |

* cited by examiner

*Primary Examiner*—Mark Zimmerman
*Assistant Examiner*—Kimbinh T. Nguyen
(74) *Attorney, Agent, or Firm*—Jonathan Harris; Steve Lin; Robert Platt Bell

(57) ABSTRACT

A software graphics engine includes a selectable mode filter for improved texture mapping. An x, y pixel coordinate is mapped into a u, v texture map. The mapped u, v coordinate includes integer and fractional portions. Depending on the location of the coordinate relative to the four nearest texels, which are represented as integers, one of several texture mapping schemes are used to either select or calculate the texel value to be used to render the pixel at the x, y screen location. The three texture mapping schemes include point sampling in which the nearest texel from the texture map is selected, two-texel averaging in which the closest two texels are combined in a weighted average, and four-texel averaging in which the closest four texels are combined in a weighted average. By providing a selectable filter than can perform point sampling or two or four-texel averaging, the speed benefit of point sampling can be approached as well as the superior quality of two- and four-texel averaging.

46 Claims, 9 Drawing Sheets

DYNAMICALLY SELECTABLE TEXTURE FILTER FOR A SOFTWARE GRAPHICS ENGINE

CROSS-REFERENCE TO RELATED APPLICATIONS

This application is a continuation-in-part of application Ser. No. 08/831,283 entitled "Dynamically Selectable Texture Filter For Computer Graphics," filed Mar. 31, 1997.

STATEMENT REGARDING FEDERALLY SPONSORED RESEARCH OR DEVELOPMENT

Not applicable.

BACKGROUND OF THE INVENTION

A. Field of the Invention

The present invention relates generally to a graphics system for a personal computer. More particularly, the present invention relates to a system for providing texture to images on a computer screen. Still more particularly, the present invention relates to an improved texturing technique that uses a selectable mode texture filter for applying a texture map to pixels on a screen.

B. Background of the Invention

Before the availability of the personal computer (commonly referred to as a PC), computer graphics packages were expensive tools primarily reserved for industrial applications. Early microcomputers were only capable of rendering simple line drawings with a low screen resolution (256 pixels×256 pixels, for example). As microcomputers evolved, higher resolution color displays became available, and software applications routinely provided data output in a graphical format. The graphics techniques used were unstructured, with objects defined in terms of absolute coordinates using straight lines. Subsequently, graphics "primitives" were developed, enabling circles, ellipses, rectangles and polygons to be drawn with single software instructions. The use of primitives for drawing shapes increased the speed at which the images could be rendered.

The availability of computer graphics has generated a demand for higher resolutions and three dimensional (3-D) rendering capabilities. Computer animation and games, in particular, have spawned a revolution in computer graphics capabilities. A 3-D image can be represented in a computer system as a collection of graphical objects, such as polygons, lines, and points. A set of vertex points defines a polygon. Associated with each point are certain parameters, such as shading, texturing, color, and the like. Identification of other non-vertex points within the polygon typically is done through the use of linear interpolation. Once interpolated, the polygon can be rendered on a computer monitor by scanning of successive rows of the polygon. By drawing multiple polygons on the screen at a time, an object can be drawn.

Further advancements in the computer graphics arena have led to techniques for enhancing the realistic appearance of objects drawn on the screen. Texture mapping, one of the significant aspects of 3-D graphics permits images on a computer screen to be displayed with texture. Thus, for example, a table top can be textured to have the appearance of a wood-grain or marble surface, or any other desired surface. In computer graphics, a texture map is an array of pixels that represents a particular pattern, such as a single brick. By repeatedly applying the texture map of a brick to side of a building, for example, the side will appear as a brick wall. The amount of memory required to represent the brick wall is minimal because only enough memory is required to store a texture map for a single brick. A pixel in a texture map is called a "texel." A texture map typically is constructed from a two-dimensional array of texels (typically represented with digital values). A u, v address or coordinate associated with each texel value in the texture map. Pixels on the computer screen, however, are assigned x, y addresses to represent the spatial location of the pixel on the computer screen. Thus, a pixel with an address of (10, 14) would be in the tenth column of pixels, fourteen rows down on the computer screen. Because texel values are not assigned an x, y value when applying a texture map to a polygon on the screen, a conversion from an x, y pixel address to a u, v texture map address is necessary. The conversion process is termed "mapping." A texel mapping algorithm thus uses an x, y pixel address to look up a corresponding texel in a texture map. The texel is then used to render the pixel at the x, y screen address.

Ordinarily, an x, y pixel address converts to a fractional u, v texture map coordinate. A "10.16" format is typically used to represent the converted u and v coordinates in which 10 bits are used for the integer portion of the coordinate along with 16 fractional bits. The coordinates of texel values in a texel map, however, include only integer values, and thus the converted u, v coordinate usually will not correspond exactly to a texel in the texel map. Point sampling provides the simplest method for selecting a texel from a texel map for applying to objects. In point sampling, the texel from the texel map closest to the fractional u, v coordinate is selected to render the corresponding x, y pixel on the screen. For example and referring to FIG. 1, four texels A, B, C, and D from a texture map are shown with their integer u, v coordinates. An address in x, y space might convert to u, v texture space as point P1 with u, v coordinates (1.25, 1.30). Of the four closest texels A, B, C, and D, point P1 is closest texel A. Using the point sampling technique, texel A would be selected to be mapped onto the x, y pixel associated with point P1. With point sampling, only one texel is used for each pixel during mapping and thus only one memory access is required to fetch the selected nearest texel. Although simple and fast, images rendered with point sampling may appear blocky and "scintillate," or sparkle, when the object moves detracting from the appearance of the object.

In certain instances, however, point sampled images are acceptable. For example, rendered with perspective, a brick wall may appear to recede into the distance. The appearance of the foreground part of the wall would suffer if point sampling was used. However, the problems associated with point sampled images would be imperceptible if point sampling was used to texture the distant part of the wall because of the diminished resolution associated with objects drawn to appear distant.

Filtering techniques such as bilinear averaging result generally in higher quality texture images. Bilinear averaging combines the four nearest texels in a weighted average to derive a single texel value used to render the pixel. Referring again to FIG. 1, in the u axis point P1 is generally closer to texel A than texel B and closer to texel C than texel D. Thus, the bilinear weighted average of texels A, B, C, and D generally weights A more than B, and C more than D. In the v axis, the result is similar with texels A and B weighted more heavily than texels C and D because point PI is closer to texels A and B than C and D. Bilinear averaged images achieve superior quality than point sampled images, but require more computer and processing power. Because four texels are averaged together, four accesses to texture memory are required to fetch the four texels, taking considerably more time than the single memory access required by point sampling. Further, the averaging process, including calculation of the weights associated with each texel to be averaged, requires time to perform.

Graphics systems that employ texturing typically use only one texture mapping technique at a time when rendering images. Thus, one graphics system might use point sampling for faster speed, while other systems might use bilinear averaging for higher quality. Both types of systems, however, suffer from the problems attendant to each texturing technique.

There is a need for an improved graphics system that provides the high quality texture mapped images of bilinear averaging and other filtering methods, at speeds comparable to point sampling techniques. Such a system would permit high quality graphics at speeds faster than permitted by standard filtering techniques. Despite the advantages such a system would offer, to date no such system has been developed.

BRIEF SUMMARY OF THE INVENTION

A software graphics engine is disclosed which includes a selectable mode filter for improved texture mapping. As part of the texturing process, and in accordance with prior techniques an x, y pixel address is converted to a u, v coordinate in a texture map. The converted u, v coordinate includes integer and fractional portions. The texture map includes texels with only integer coordinates. Depending on the location of the u, v coordinate relative to the four closest texels, the present invention selects one of three texture mapping schemes to select a texel value from the texel map to use in rendering the pixel at the x, y pixel address. The three texture mapping schemes used to select the texel value preferably include point sampling (in which the nearest texel from the texture map is selected), two-texel averaging (in which the closest two texels are combined in a weighted average), and four-texel averaging (in which the closest four texels are combined in a weighted average).

In accordance with the present invention, the software graphics engine selects the texture mapping scheme to implement based upon some predetermined criteria. Accordingly, the point sampling scheme preferably is implemented when the u, v coordinate is within a predetermined distance from a texel. If the point sampling scheme is implemented, the closest texel is selected and used to render the x, y pixel. Point sampling generally is faster than other texture mapping techniques, but provides graphics images whose quality is inferior to other techniques. By only implementing point sampling when the converted u, v coordinate is relatively close to a texel value in the texel map, graphics distortion is kept at a minimum, while the system speed is maximized.

If, however, the converted u, v coordinate is located within a predetermined distance from two texels, but greater than a certain distance from all other texels, then the two closest texels are combined in a weighted average. The two-texel average weights the closest texel proportionately more heavily than the other texel. The weights calculated for each texel in the two-texel average is a function of the proximity of each texel to the converted u, v coordinate. Two-texel averaging generally is slower than point sampling because two texels must be fetched from memory, weights for each texel must be calculated, and the texels then must be combined in a weighted average. The quality of two-texel filtered images, however, is generally superior to images produced by point sampling. In addition, the graphics processing of a two-texel filtering scheme is faster than a four-texel averaging scheme.

If the mapped u, v coordinate is sufficiently distant from all four of the four closest texels, the four closest texels are combined in a weighted average based upon the proximity of each texel to the converted u, v coordinate values. Consequently, texels closer to the u, v location are weighted more heavily than the texels located farther away from the converted coordinates. Four-texel averaging generally provides superior computer graphics, but requires the time-consuming retrieval of four texels from memory, as well as the calculation of a weight for each texel and the weighted combination of the four texels.

By providing software that implements a dynamically selectable filter that performs point sampling, as well as two or four-texel averaging, the graphics system can achieve the speeds approaching those of systems that use only point sampling, while at the same time obtaining superior quality texturing. Moreover, the areas in the texture map in which each of the three texture mapping techniques is used is adjustable permitting increased system flexibility to fine tune the texture mapping process. Thus, an application program uses the fast point sampling when quality and accuracy of an individual texel is of less concern, while using a higher quality scheme in other instances.

BRIEF DESCRIPTION OF THE DRAWINGS

For a detailed description of the preferred embodiments of the invention, reference will now be made to the accompanying drawings wherein.

DETAILED DESCRIPTION OF THE INVENTION

Figure 2:
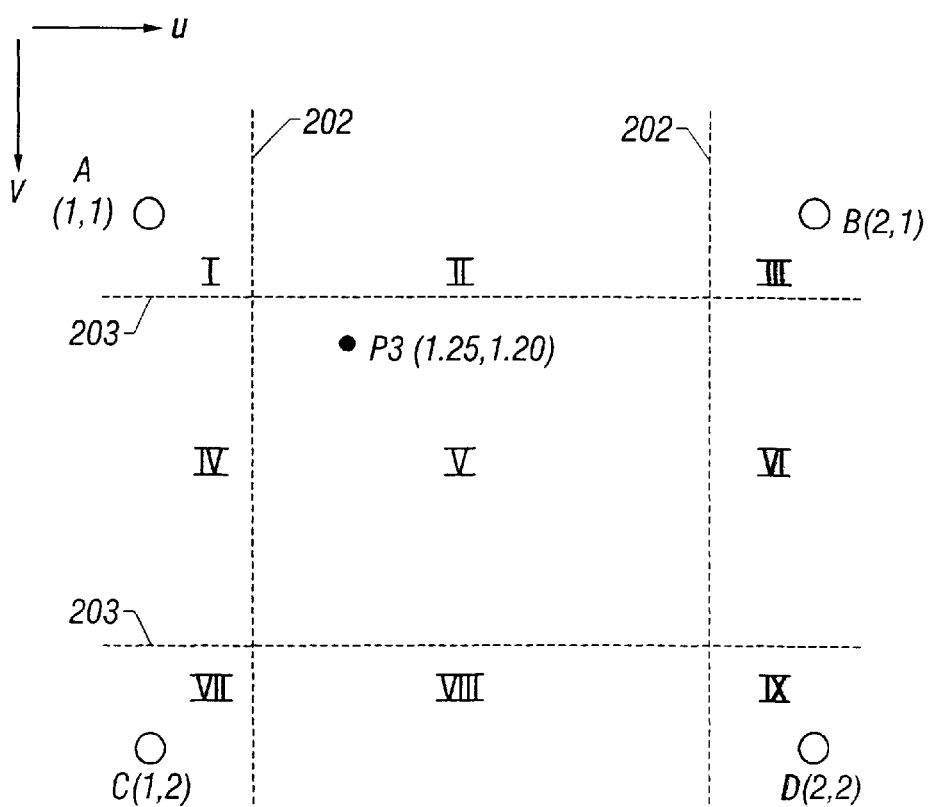
FIG. 2 is a portion of a texture map divided into nine regions for texture mapping in accordance with the present invention.

Referring now to FIG. 2, a group of four texels A, B, C, D from an exemplary texture map is shown divided into nine regions labeled I, II, III, IV, V, VI, VII, VIII, and IX, respectively. The nine regions are separated by dashed lines 202a, 202b, 203a, and 203b. Each texel has an integer u, v address or coordinate. As shown, the u axis runs horizontally and the v axis runs vertically in accordance with normal convention. Texel A has a u, v address of (1,1), while the address of texel B is (2,1), and the addresses of texels C and D are (1, 2) and (2, 2), respectively. As discussed in the Background of the Invention, the conversion of an x, y address to a u, v coordinate typically results in a u, v coordinate with a fractional value. The selectable mode filtering technique of the present invention dynamically selects an appropriate texturing technique for each pixel. The selection of the texturing technique depends on the location of the converted u, v coordinate within the nine regions.

Texture mapping techniques, such as point sampling and bilinear averaging for example, have advantages and disadvantages. Point sampling is generally faster than bilinear averaging, but bilinear averaging generally produces higher quality images than images produced using point sampling. Current graphics systems typically only use one texture mapping technique. Thus, one system might use only point sampling to texture map an object on the screen, while another system might use bilinear averaging. The advantages current graphics systems enjoy, as well as the disadvantages such systems suffer, depend to a large extent on the particular texture mapping technique used. Generally, graphics systems designers tradeoff speed against quality; higher speed is achieved with point sampling and higher image quality is achieved with bilinear averaging.

Figure 1:
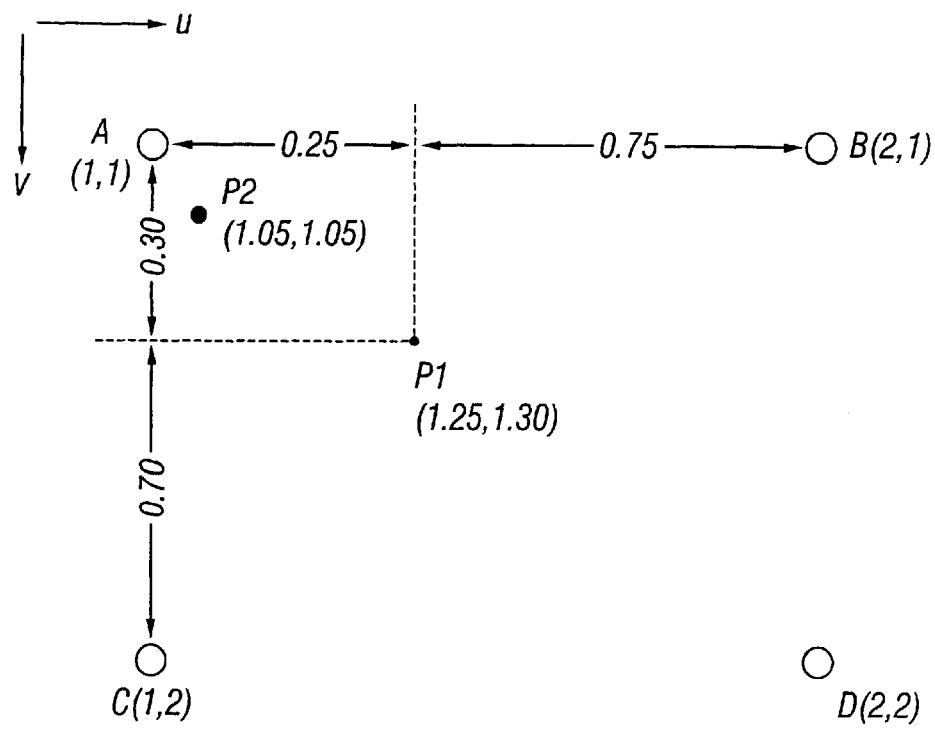
FIG. 1 shows an exemplary portion of a texture map including two points with fractional u, v coordinates.

The present invention takes advantage of the benefits of three texture mapping techniques and uses each technique only in those situations in which the speed versus quality tradeoff favors each techniques. Moreover, one skilled in the art will understand that other mapping techniques may be included as part of the selection process, with selection of a particular scheme to implement based upon certain criteria. The determination as to which texturing technique to use is made dynamically for each texel while the image is being drawn on the screen. Thus, one texel value for rendering a pixel may be produced using one texturing technique, while the next texel is produced using a different technique, and so on. Thus, in those situations when the benefit of point sampling (greater speed) outweighs its disadvantage (lower quality images), point sampling is used as the texture mapping technique by the present invention. Conversely, in those instances that favor filtering, the two or four nearest texels are linearly averaged together. For example, referring to FIG. 1, the u, v coordinate of point P2 (1.05, 1.05) is very close to texel A, Graphics systems that use bilinear averaging will combine texels A, B, C, and D to generate a texel for point P2. Because of the substantial proximity of point P1 to texel A, however, the value of texel A dominates the averaging equation and heavily influences the texel value of point P1. In fact, the texel value computed for point P1 may be almost identical to the value of texel A. In that case bilinear averaging provides little benefit because the weights given to texels B, C, and D are minimal compared to the weight given texel A. The same result is true for any u, v point substantially close to a texel. Thus, for this situation, the speed advantage of point sampling outweighs the quality advantage of bilinear averaging.

Referring again to FIG. 2, regions I, III, VII, and IX represent those regiions in which point sampling preferably is used by the present invention. For u, v coordinates failing within these regions, the speed advantage of point sampling generally outweighs the quality benefit of bilinear averaging, or any other filtering technique. Bilinear filtering (or four-texel averaging) is employed for u, v coordinates falling within region v because points in region v are sufficiently distant from texels A, B, C, and D that the quality benefit of bilinear filtering becomes crucial, outweighing the greater speed of point sampling.

For u, v points falling within regions II, IV, VI, and VIII, a different filtering method is used in which the nearest two texels are averaged together with appropriate scale factors. Points in region II are sufficiently distant from texels C and D that if bilinear averaging were used, the relative contributions to the computed texel value would be dominated by contributions from texels A and B, with little contribution from texels C and D. In computing texel values for points in region II, texels C and D are ignored and only texels A and B are used in a two-texel scaled averaging technique. Scale factors are calculated for each texel A and B. The scale factors are a function of the proximity of the u, v coordinate to each texel. Thus, closer texels are weighted more heavily than more distant texels. Similarly, for region IV, texels A and C are averaged. For region VI texels B and D are averaged and for region VIII, texels C and D are averaged.

Figure 3:
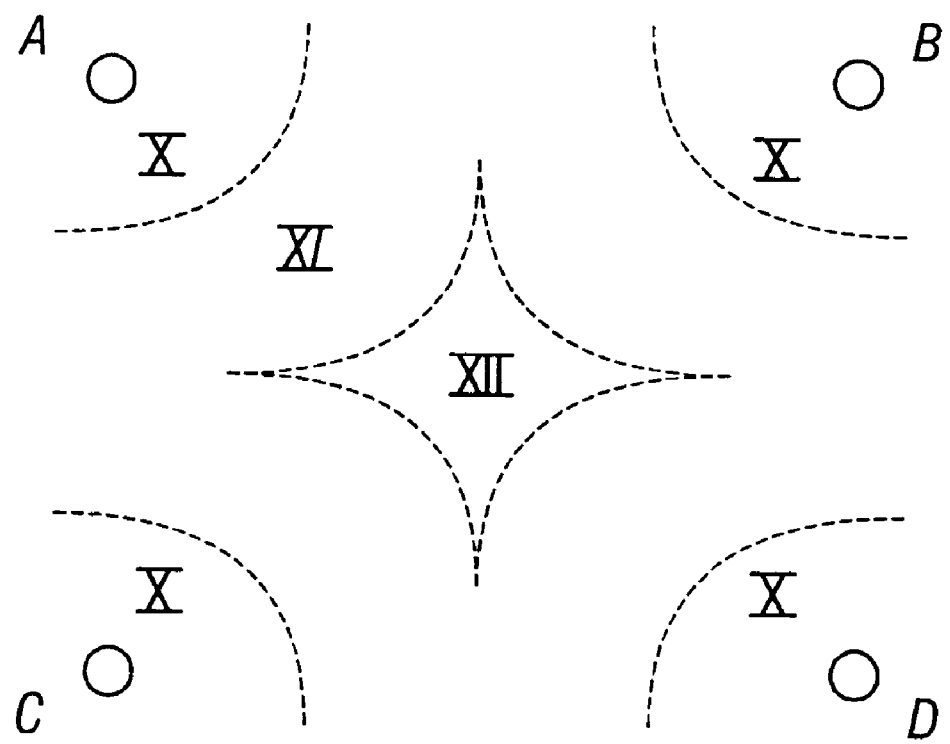
FIG. 3 shows an alternative texture map to that of FIG. 2.

By permitting the location of the boundary defining lines 202a, 202b, 203a, 203b to be programmable, the present invention also advantageously allows for control over the sizes of the nine regions I–IX. Moreover, by controlling the sizes of the nine regions, the present invention provides flexibility in determining when to use each of the three texturing mapping techniques. Further, while a recanular boundary region has been defined, it should be understood that other boundary schemes may be used without departing from the principles of the present invention, as shown for example in FIG. 3. In FIG. 3 point sampling may be used for u, v coordinates in regions X, two texel averaging in region XI, and four-texel averaging in region XII. For purposes of the following description, the preferred scheme of FIG. 2 will be described with the understanding that other schemes are available and could be implemented without departing from the principles of this invention.

Figure 4:
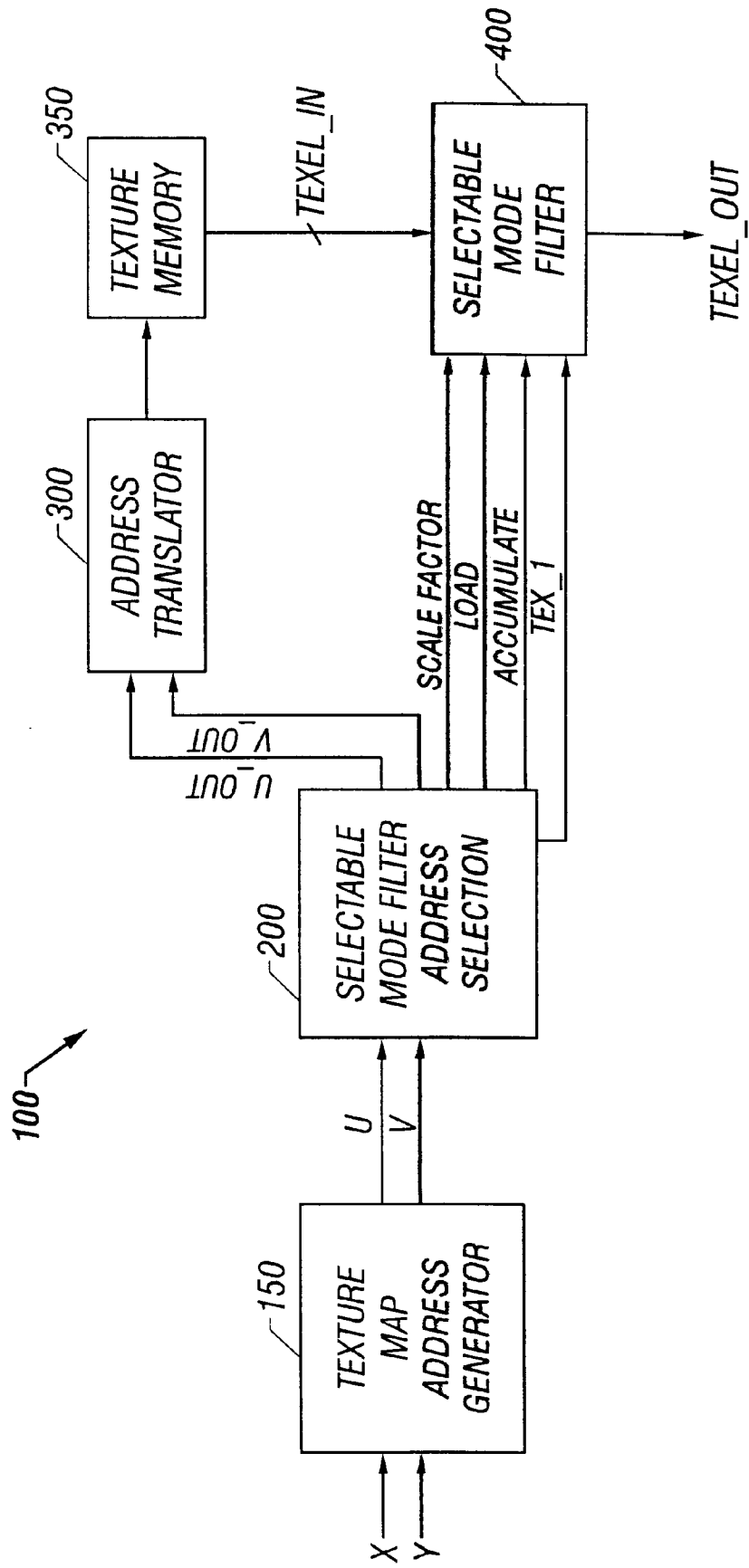
FIG. 4 shows a block diagram of the present invention including selectable mode filter address selection and a selectable mode filter.

Referring now to FIG. 4, a graphics system 100 constructed in accordance with a preferred embedment includes texture map address generator 150, selectable mode filter address selection 200, address translator 300, texture memory 350, and selectable mode filter 400. Broadly, an x, y pixel address is provided as an input to texture map address generator 150 which converts the x, y pixel address to a fractional u, v texel coordinate (i.e., a coordinate with integer and fractional portions). Graphics system 100 uses the u, v coordinate to access texel values from texture memory 350. Selectable mode filter 400 linearly combines the texel values (texel_in) from texture memory to compute a single texel output value (texel_out) which then is used to render the pixel associated with the x, y address. The texel_in values are linearly combined for purposes of the following description, the preferred scheme of FIG. 2 will be described, with the understanding that other schemes are available and could be implemented without departing from the principles of this invention by selectable mode filter 400 according to scale factors provided by selectable mode filter address selection 200. Load and accumulate signals are also provided by selectable mode filter address selection 200 to selectable mode filter 400 to control operation of filter 400, as will be explained in detail below.

Texture map address generator 150, address translation 300, and texture memory 350 are components known to those of ordinary skill in the art. Texture map address generator 150 preferably converts an x, y pixel address to a u, v coordinate in a 10.16 format. Additional u,v coordinates are generated in accordance with any suitable texture mapping technique. For example, the technique described in U.S. application Ser. No. 08/948,626, filed Oct. 10, 1997 entitled "Auto Level of Detail-based MIP Mapping in a Graphics Processor," describes a suitable technique and is therefore incorporated herein by reference. The u, v coordinate with a 10. 16 format, as described previously, includes 10 integer bit and 16 fractional bit values. As will be explained below, selectable mode filter address selection 200 produces an integer u, v texel address, (t_out, v_out,) according to the selectable mode texturing techniques of the present invention. Address translation unit 300 translates the (u_out, v_out) texel_address into a texture memory address.

Texture maps preferably are stored in texture memory 350. Texture memory 350 may include any common memory device such as random access memory (RAM) or synchronous dynamic random access memory (SDRAM). The texture map address provided by address translation 300 to texture memory 350, therefore, preferably comprises physical memory address space. Address translation 300 may be integrated in the memory controller unit (not specifically shown) of the computer if desired.

Figure 5:
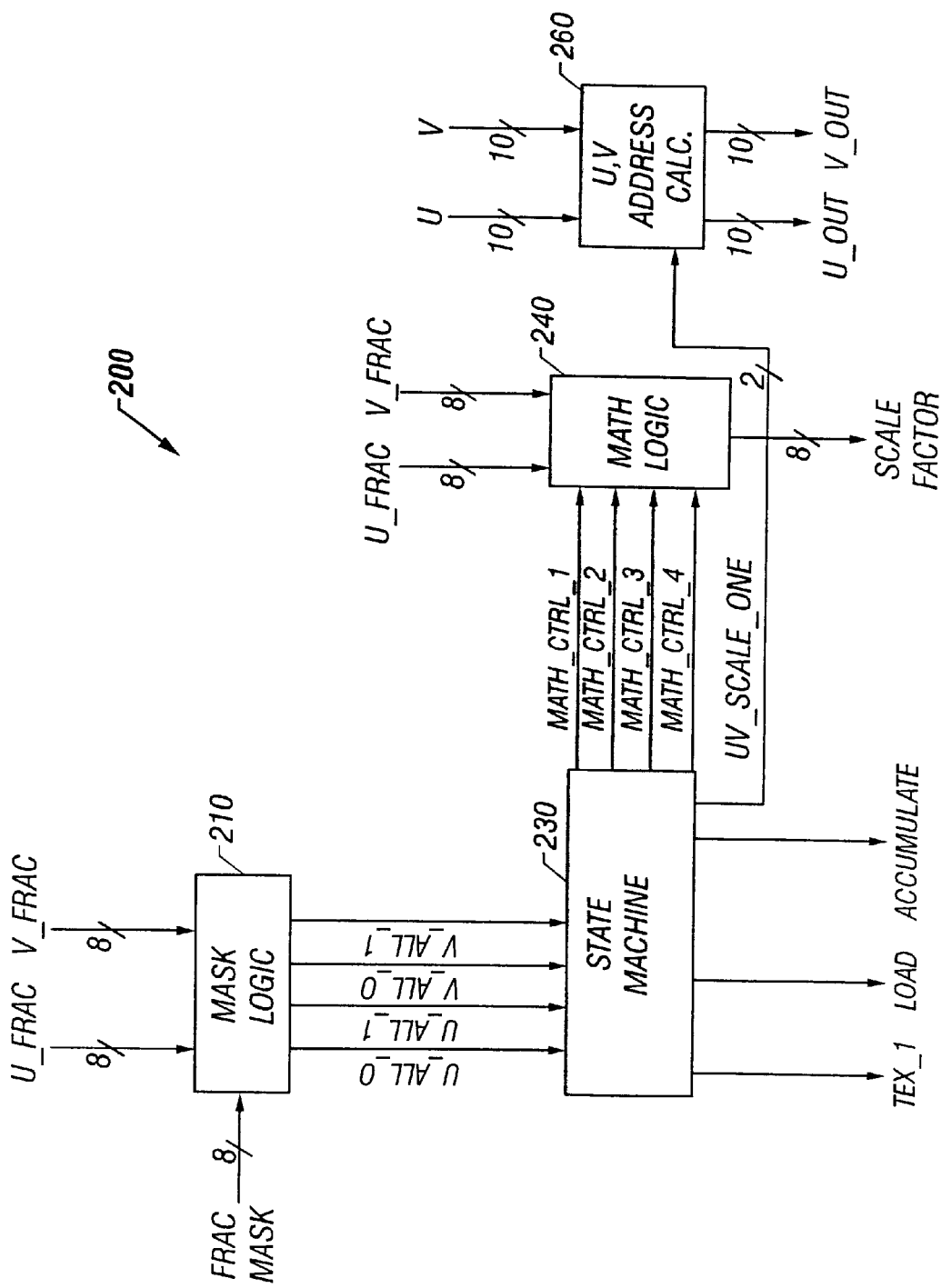
FIG. 5 shows a more detailed block diagram of the selectable mode filter address selection of FIG. 3 including mask logic, a state machine, math logic, and u, v address calculation.

Referring now to FIG. 5, selectable filter address selection 200 generally includes mask logic 210, state machine 230, math logic 240, and u, v address calculation 260. Mask logic 210 receives the fractional portion of the u, v address as input signals (u_frac and v_frac). In the 10.16 format, 16 fractional bits (bits 0–15) are used to represent each u and v coordinate. To simplify the circuitry, however, only a subset of the 16 fractional bits are used in the preferred embodiment of the present invention. Preferably the eight most significant fractional bits (bits 8–15) of each u coordinate and v coordinate are used as the u_frac and v_frac signals. A frac mask signal is also provided as an input to mask logic 210. The frac mask signal preferably is stored in memory in the computer and provided to mask logic 210 by known techniques. The frac mask signal preferably is an eight bit value that determines the location of the dashed lines 202a, 202b, 203a, 203b (FIG. 2) relative to the texels, as will become apparent below.

Mask logic 210 uses the u_frac and v_frac signals to determine in which of the nine regions (FIG. 2) the associated u, v coordinate lies. A explained in detail below with reference to FIG. 6, mask logic 210 applies the frac mask signal to the u_frac and v_frac signals to produce four output signals (u_all_0, u_all_1, v_all_0, and v_all_1), which are provided to state machine 230. The state of these four signals signifies in which of the nine regions the u, v coordinate lies.

Based on the state of the four output signals (u_all_0, u_all_1, v_all_0, and v_all_1), state machine 230 produces three control signals (tex_1, load, and accumulate) that specify the filtering scheme to implement. As shown in FIG. 4, the control signals (tex_1, load and accumulate) are provided to selectable mode filter 400, which, based upon the control signals, either computes a two or four texel averaged value or selects the nearest texel for point sampling. Referring again to FIG. 5, state machine 230 also produces four control signals for directing the operation of math logic 240. A fifth control signal (uv_plusone) is transmitted to u, v address calculation 260 which determines the u_out and v_out signals based upon that control signal.

After determining in which region the u, v coordinate lies, state machine 230 preferably directs the present invention to provide a single texel value if point sampling is appropriate (regions II, IV, VI, and IX), two texels if two texel averaging is appropriate (regions II, IV, VI, and VIII), or four texels if bilinear averaging is appropriate (region V). The state machine is clocked through predetermined appropriate states to produce the necessary texels for texture mapping in accordance with the present invention. State machine 230 is described in greater detail below with respect to FIGS. 8 and 9.

Math logic 240 uses the u_frac and v_frac signals along with the math_ctrl signals (math_ctrl_1-math_ctrl_4) provided by state machine 230 and performs the mathematical calculations to determine the appropriate scale factors or weights associated with two-texel or four-texel averaging. Point sampling requires no scaling and thus no weight is calculated during point sampling. The calculated weights are provided as a series of output scale factors from math logic 240. If the two texel averaging scheme is implemented two texels are combined as a scaled average. Math logic 240 thus computes one scale factor for each texel to be averaged. Similarly, in bilinear or four texel averaging, four texels are combined in a weighted average, and math logic 240 computes a unique scale factor for each of the four texels to be averaged. Based on the state of the u_all_0 u_all_1, v_all_0, and v_all_1 control signals, state machine 230 determines whether two or four texel averaging is to be performed and directs math logic 240 accordingly. In response, math logic 240 provides a series of output scale factors.

The u, v address calculation 260 determines the coordinate of each texel to be averaged during two or four texel averaging. For two-texel averaging, u, v address calculation 260 generates two u_out, v_out texel coordinates corresponding to the two texels to be averaged. During four-texel averaging mode, u, v address calc generates four u_out, v_out texel coordinates. The 10 bit integer portion of the u, v texel coordinate generated by texture map address generator 150 (FIG. 4) is provided as an input signal to u, v address calculation 260. As one skilled in the art will understand, the 10 bit integer portion of all u, v coordinates within regions I–IX of FIG. 2 correspond to the location of texel A. That is, the integer portion of any u, v, location within regions I–IX is (1, 1), the coordinate of texel A To generate the coordinate any of the other three texels B, C, and/or D needed for texture mapping, either or both of the u and v values is incremented. Thus, to generate the coordinate of texel B (2, 1), the u input value to u, v address calculation 260 is incremented by one integer value, while the v input integer value remains 1. Similarly to generate the coordinate of texel C (1, 2), the u input integer value remains a 1, while the v input value integer is incremented by 1. Finally, to generate the coordinate for texel D (2, 2), both u and v input integer values are incremented by 1. The uv plusone signal from state machine 230 is used by u, v address calculation 260 to determin when a u and/or v coordinate value is to be incremented. The uv_plus_one signal preferably comprise two bits, one bit for u and the other bit for v. Further, a logic one may be used to mean increment the associated 10 bit integer coordinate and a logic zero may be used to mean do not increment the associated 10 bit coordinate. Logic for incrementing the 10 bit u and v coordinates is known by those of ordinary skill in the art and thus is not specifically shown.

The four math_ctd signals and the uv_plus_one signal generated by state machine 230 directs u, v address calculation 260 to produce u_out, v_out texel coordinates and math logic 240 to produce scale factor values associated with each u_out, v_out coordinate. Thus, for two-texel averaging u, v address calculation 260 produces two texel coordinates and math logic 240 provides a scale factor with each coordinate (i.e., one scale factor per each u, v coordinate). Similarly, for four-texel averaging, u, v address calc 260 provides four texel coordinates and math logic 240 provides four scale factors with each coordinate. State machine 230 controls the timing of math logic 240 and u, v address calc 260 so that the scale factors are provided at substantially the same time as the u_out, v_out texel coordinates are provided.

Figure 6A:
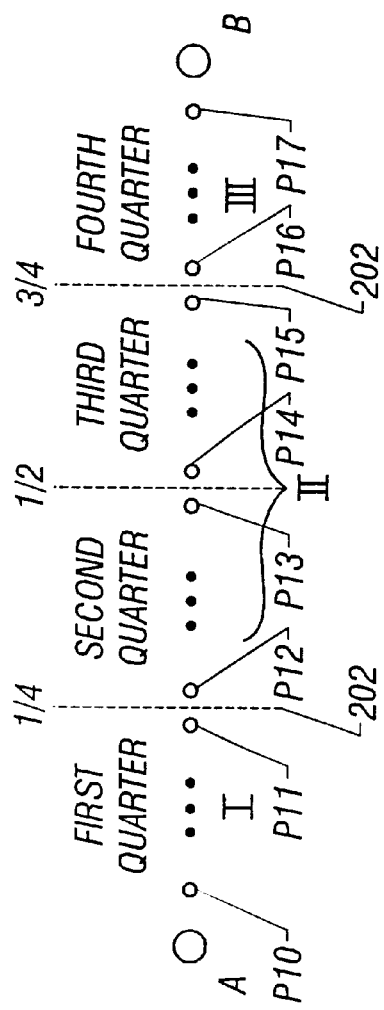
FIG. 6A shows two exemplary texels of a texture map with intervening coordinate positions divided into four portions.

Referring now to FIG. 6A, texels A and B are shown with a portion of regions I, II and III. Although the concept of distinguishing the various regions is shown with respect to regions I, II and III in the u axis, the same principle also applies to the v axis and regions IV–XI as well. The present invention uses the 8 most significant bits of the fractional portion of each u, v coordinate for texture mapping. Thus, there are $2^8$ or 256 8-bit u, v fractional coordinates between adjacent texels. The u, v points P10, P11, P12, P13, P14, P15, P16, and P17 represent eight of the 256 fractional coordinates between texels A and B. The fractional values of the u, v coordinates associated with points P10–P17 are shown below in Table I.

TABLE I

| | 8-Bit u, v coordinate value | | | | | | | |
|---|---|---|---|---|---|---|---|---|
| Point | 7 | 6 | 5 | 4 | 3 | 2 | 1 | 0 |
| P10 | 0 | 0 | 0 | 0 | 0 | 0 | 0 | 0 |
| P11 | 0 | 0 | 1 | 1 | 1 | 1 | 1 | 1 |
| P12 | 0 | 1 | 0 | 0 | 0 | 0 | 0 | 0 |
| P13 | 0 | 1 | 1 | 1 | 1 | 1 | 1 | 1 |
| P14 | 1 | 0 | 0 | 0 | 0 | 0 | 0 | 0 |
| P15 | 1 | 0 | 1 | 1 | 1 | 1 | 1 | 1 |
| P16 | 1 | 1 | 0 | 0 | 0 | 0 | 0 | 0 |
| P17 | 1 | 1 | 1 | 1 | 1 | 1 | 1 | 1 |

Points P10 and P17 represent points immediately adjacent to texels A and B and points P11–P16 represent intermediate points. The 256 8-bit u, v fractional coordinates between texels A and B can be divided into four sections or quarters shown by the dashed lines labeled ¼, ½, and ¾ in FIG. 6A. Point P11 represents the last point in the first quarter, while point P12 represents the first point in the second quarter. Similarly, points P13 and P14 represent the last point in the second quarter and the first point in the third quarter, respectively. Finally, points P15 and P16 represent the last point in the third quarter and the first point in the fourth quarter. Region I includes points in the first quarter. Region II includes fractional coordinates in the second and third quarters, and region III includes points in the fourth quarter.

As can be seen in Table I, the two most significant bits (bits 6 and 7) of the 8-bit fractional coordinate to the left of the dashed line determine in which quarter, and thus in which region, the point lies. Points P10 and P11 both lie in the first quarter and both have "00" values for the two most significant bits. Points P12 and P13 are in the second quarter and both have values of "01" for bits 6 and 7, while points P14 and P15 have "0" for bit positions 6 and 7. Finally, points P16 and P17 are in the fourth quarter and both have "11" for bits 6 and 7. Because the boundary lines 202a, 202b separating regions I, II, and III align with the boundaries between the first and second quarters and the third and fourth quarters, whether a fractional coordinate value is included in regions I, II, or III is determined simply by inspection of the upper two most significant bits of the fractional values u_frac and v_frac. Coordinate values in region I have all 0 values as bits 6 and 7, while coordinate values in region III have all 1 values as bits 6 and 7. Coordinate values in region II are distinguishable because they have at least one 0 value and at least one 1 value in bit positions 6 and 7 (either "01" or "10").

Figure 6B:
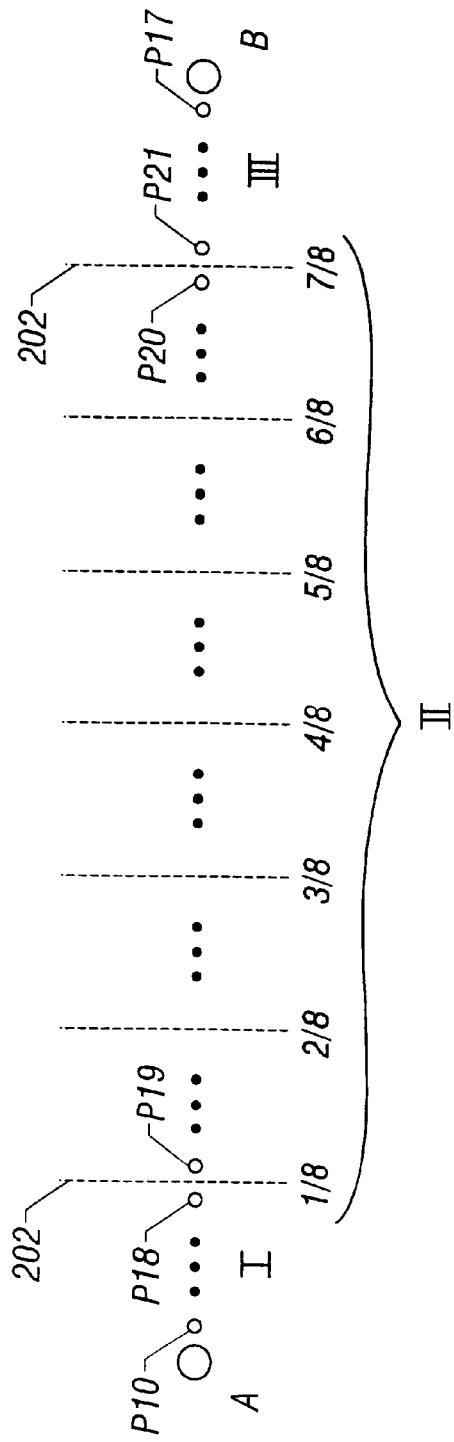
FIG. 6B shows two exemplary texels of a texture map with intervening coordinate positions divided into eight portions.

By way of a further example, with reference to FIG. 6B the 256 8-bit fractional coordinates between texels A and B can be divided into eight equal areas separated by dashed lines labeled ⅛, ⅖, ⅜, ⅘, ⅝, ⅝, and ⅞. The boundary lines 202a, 202b of regions I, II, and m can be aligned with the ⅛ and ⅞ demarcations as shown in FIG. 5B. To determine in which eighth portion an 8-bit coordinate lies, inspection of the upper three most significant bits (bit positions 5–7) of the u, v coordinate is necessary as shown to the left of the dashed line in Table II below.

TABLE II

| | 8-bit u, v coordinate | | | | | | | |
|---|---|---|---|---|---|---|---|---|
| Point | 7 | 6 | 5 | 4 | 3 | 2 | 1 | 0 |
| P10 | 0 | 0 | 0 | 0 | 0 | 0 | 0 | 0 |
| P18 | 0 | 0 | 0 | 1 | 1 | 1 | 1 | 1 |
| P19 | 0 | 0 | 1 | 0 | 0 | 0 | 0 | 0 |
| P20 | 1 | 1 | 0 | 1 | 1 | 1 | 1 | 1 |
| P21 | 1 | 1 | 1 | 0 | 0 | 0 | 0 | 0 |
| P17 | 1 | 1 | 1 | 1 | 1 | 1 | 1 | 1 |

Coordinate values in region I will have as their three most significant bits (bits 5–7) a value of "000" while coordinate values in region III will have the value of "111" in the positions 5–7. By default, coordinate values in region II can be determined because the upper three bit positions will not be all binary 0 values or all binary 1 values.

As demonstrated by the examples above, examination of the most significant bits of u_frac determine whether the associated coordinate is in regions I, IV, VII or regions II, V, VII, or regions III, IV, IX. Thus, considering just the upper order bits in u_frac divides the u axis into three distinct areas. A similar trisection occurs with respect to the v axis by examination of the upper order bits of v_frac. The intersection of the area in the u axis including a u, v coordinate and the area in the v axis also including the coordinate results in a single region out of nine regions. This region is the region in which the u, v coordinate lies.

Referring again to FIG. 2, the number of most significant bits of u_frac and v_frac that are considered in the examination described above dictates the relative location of boundary lines 202a, 202b, 203a, 203b. The frac mask signal is an eight bit code that specifies which upper order bits of the u_frac and v_frac values are to be considered in determining the region associated with the coordinate. Preferably logic 0 values in the frac mask signify that the corresponding bit positions in the eightbit fractional coordinate value is to be considered and logic 1 values signify the corresponding bits are to be ignored. For example, a frac mask signal "0011 1111" dictates that the two most significant bits in the eight bit fractional coordinate are to be considered. Similarly, a frac mask signal "0001 1111" signifies that the three most significant bits of the fractional coordinate value are to be considered. Thus, the n most significant bits (where $1 \leq n \leq 8$) in the frac mask effectively determines the location of boundary lines 202a, 202b, 203a, 203b in the texture map. One of ordinary skill in the art will recognize alternatively that other coding schemes might be used to signify which bits in the fictional coordinate value are to be considered.

Figure 7:
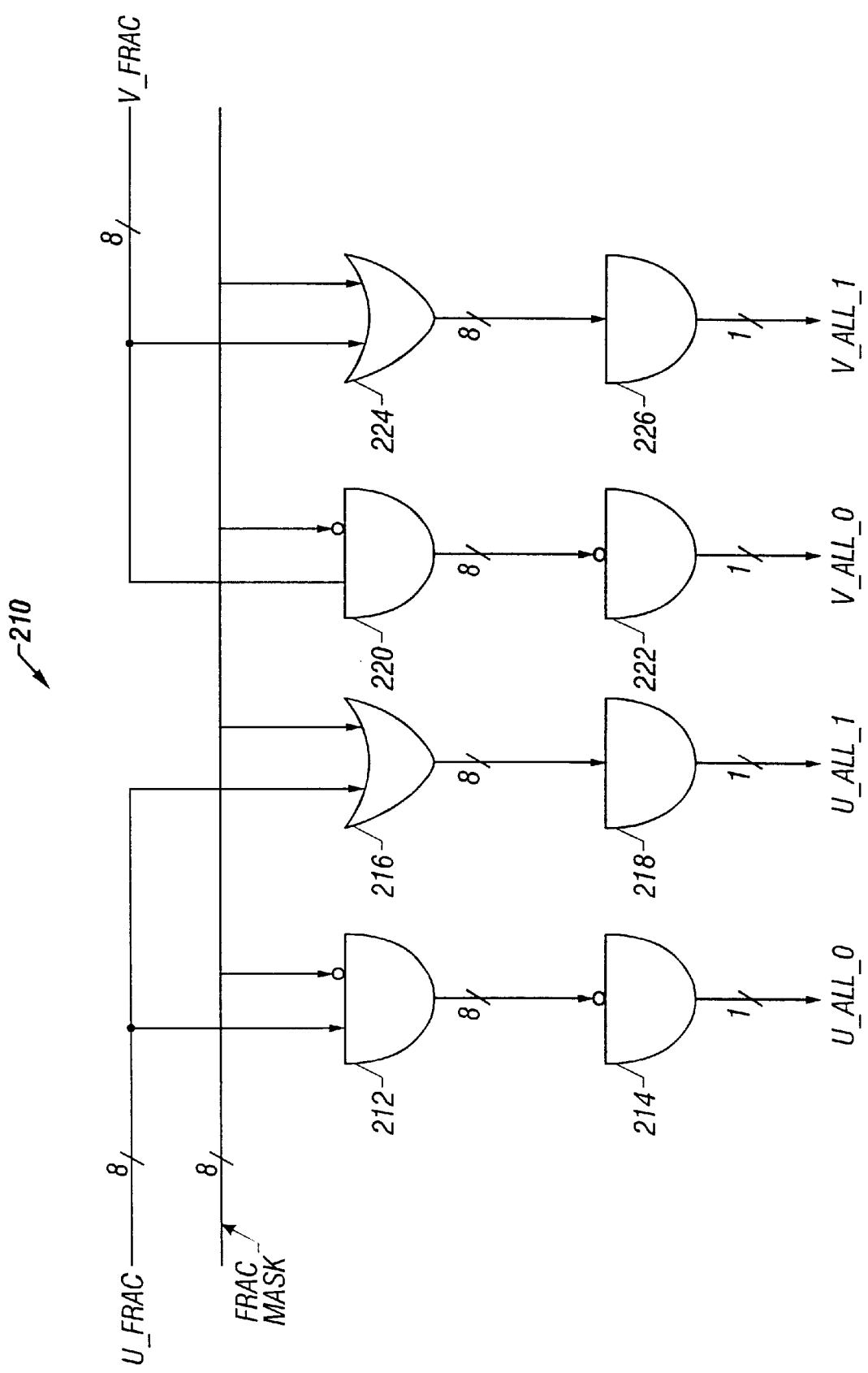
FIG. 7 shows the mask logic of FIG. 4 constructed in accordance with the present invention.

Referring now to FIG. 7, mask logic 210 preferably includes six AND gates 212, 214, 218, 220, 222, and 226 and two OR gates 216 and 224. The AND gates 212, 214, and 218 and OR gate 216 comprise the logic for generating signals $u\_all\_0$ and $u\_all_1$. The other half of the mask logic 210 including AND gates 220, 222, and 226 and OR gate 224 has comparable structure and is used to generate the $v\_all\_0$ and $v\_all\_1$ signals. Because the two halves of mask logic 210 function substantially the same, only the portion pertaining to the generation of $u\_all\_0$ and $u\_all\_1$ signals will be described. Moreover, as one skilled in the art will understand, by constructing the mask logic 200 of combinatorial logic, no extra time (in the form of clock pulses) is required to generate the mask logic output signals.

The $u\_all\_0$ output signal preferably comprises a single bit value that becomes active when the upper order bits of $u\_frac$ are all logic 0 values, indicating that the coordinate lies in region I, IV, or VII. The $u\_all\_1$ signal is also a single bit that becomes active when the upper order bits of $u\_frac$ are all logic 1 values indicating that the coordinate lies in region III, VI, or IX. If neither $u\_all\_0$ or $u\_all\_1$ are active, then it is to be inferred that the coordinate lies in region II, V, or VIII.

Referring still to FIG. 7, with respect to the generation of the $u\_all\_0$ signal, the eight bit $u\_frac$ signal is provided as an input signal to AND gate 212 and OR gate 216. The frac mask is also provided as an inverting input to AND gates 212, 220 and OR gates 216, 224. The AND gate 212 combines together the ufrac and frac mask signals in a logical AND operation to provide an eight bit output signal. A bit in the output signal of AND gate 212 is a logic 1 value only when the associated bits in $u\_frac$ is a logic 1 and in the frac mask is a logic 0 (e.g., bit 3 in $u\_frac$ is a logic 1 and bit 3 in frac mask is a logic 1). The eight bits from AND gate 212 are provided to inverting input terminals of AND gate 214 and logically AND'ed together. Thus, the output bit of AND gate 214, which represents the $u\_all\_0$ signal, becomes active (logic 1) only when each of the input bits to AND gate 214 are logic 0 values.

Two examples fully clarify how the $u\_all\_0$ signal is generated. The examples assume that the three most significant bits of $u\_frac$ are to be considered for purposes of determining the region in which a u, v coordinate lies. These three bits set boundary lines 202a, 202b at the ⅛ and ⅞ points as explained previously with respect to FIG. 6B. The frac mask thus is "0001 1111." In the first example, the u coordinate is "0001 0110" signifying that the coordinate falls in regions I, IV, or VII because bits 5–7 are "000." In the second example, the coordinate is "0011 1111" signifying that the coordinate falls in regions II V, or VIII because bits 5–7 include a mix of 0 and 1 values. The results of the two examples are shown below in Table III.

TABLE III

|  | Example 1 | | | | | | | | Example 2 | | | | | | | |
| --- | --- | --- | --- | --- | --- | --- | --- | --- | --- | --- | --- | --- | --- | --- | --- | --- |
|  | 7 | 6 | 5 | 4 | 3 | 2 | 1 | 0 | 7 | 6 | 5 | 4 | 3 | 2 | 1 | 0 |
| u_frac | 0 | 0 | 0 | 1 | 0 | 1 | 1 | 0 | 0 | 0 | 1 | 1 | 1 | 1 | 1 | 1 |
| frac mask | 0 | 0 | 0 | 1 | 1 | 1 | 1 | 1 | 0 | 0 | 0 | 1 | 1 | 1 | 1 | 1 |
| AND gate 212 output | 0 | 0 | 0 | 0 | 0 | 0 | 0 | 0 | 0 | 0 | 1 | 0 | 0 | 0 | 0 | 0 |
| u_all_0 | | | | 1 | | | | | | | | 0 | | | | |

In the first example, the output signal from AND gate 212 is all 0 values and thus, when all eight output bits of AND gate 212 are inverted and ANDed together by AND gate 214, $u\_all\_0$ is a logic 1. In the second example, the most significant three bits of ufrac are not all 0 or all 1 values (bit 5 is a logic 1 and bits 6 and 7 are logic 0) and thus the output of AND gate 212 is a logic 1 value. When inverted, that logic 1 value in bit 5 becomes a logic 0 and forces the AND operation performed by AND gate 214 to provide a logic 0 value for $u\_all\_0$. Thus, $u\_all\_0$ is a logic 1 when all the $u\_frac$ bits corresponding to the 0 values in the frac mask also have 0 values (example 1). However, $u\_all\_0$ is a logic 0 when any of the $u\_frac$ bits corresponding to the 0 values in the frac mask have a logical 1 value (example 2). Moreover, $u\_all\_0$ will be a logic 1 only when the associated u coordinate lies in regions I, IV, or VII.

The OR gate 216 and AND gate 218 generate the $u\_all\_1$ signal, which is active (logic 1) only when the u coordinate is in regions III, VI, or IX. Each bit in the output signal of OR gate 216 is a logic 1 value if the corresponding bits in either the $u\_frac$ or the frac mask is a logic 1 value. Because the lower order bits of the frac mask (bits 0–4 in the examples above) are logic 1 values, the five lower order bits of the output signal from OR gate 216 will always include logic 1 values. The upper order bits in the frac mask are logic 0 values, however, and thus, the upper order bits in the output signal from OR gate 216 are logic 1 values only if the corresponding upper order bits of $u\_frac$ are logic 1 values which indicate that the u coordinate specifies regions III, VI, or IX. Therefore, all eight output bits of OR gate 216 will be logic 1 values only if the u coordinate specifies regions III, VI, or IX. As the output of AND gate 218, u__all__1 is a logic 1 value only if all of the input bits to AND gate 218 are logic 1 values. Examples 3 and 4 in Table IV illustrate these results.

TABLE IV

|  | Example 3 | | | | | | | | Example 4 | | | | | | | |
| --- | --- | --- | --- | --- | --- | --- | --- | --- | --- | --- | --- | --- | --- | --- | --- | --- |
|  | 7 | 6 | 5 | 4 | 3 | 2 | 1 | 0 | 7 | 6 | 5 | 4 | 3 | 2 | 1 | 0 |
| u__frac | 1 | 1 | 1 | 1 | 0 | 1 | 1 | 0 | 1 | 0 | 1 | 1 | 1 | 0 | 1 | 1 |
| frac mask | 0 | 0 | 0 | 1 | 1 | 1 | 1 | 1 | 0 | 0 | 0 | 1 | 1 | 1 | 1 | 1 |
| OR gate 216 output | 1 | 1 | 1 | 1 | 1 | 1 | 1 | 1 | 1 | 0 | 1 | 1 | 1 | 1 | 1 | 1 |
| u__all__1 |  |  |  | 1 |  |  |  |  |  |  |  | 0 |  |  |  |  |

In example 3, the three most significant bits (bits 5–7) are logic 1 values indicating that the associated u coordinate is in regions III, VI, or IX. As a result, the output of OR gate 216 includes all logic 1 values and thus, u__all__1 is a logic 1. In example 4, the three most significant bits of u__frac are "101" indicating that the u coordinate is not in regions HI, VI, or IX. As a result, the output of OR gate 216 includes a 0 value (bit 6) and thus, u__all__1 is a logic 0.

Figure 8:
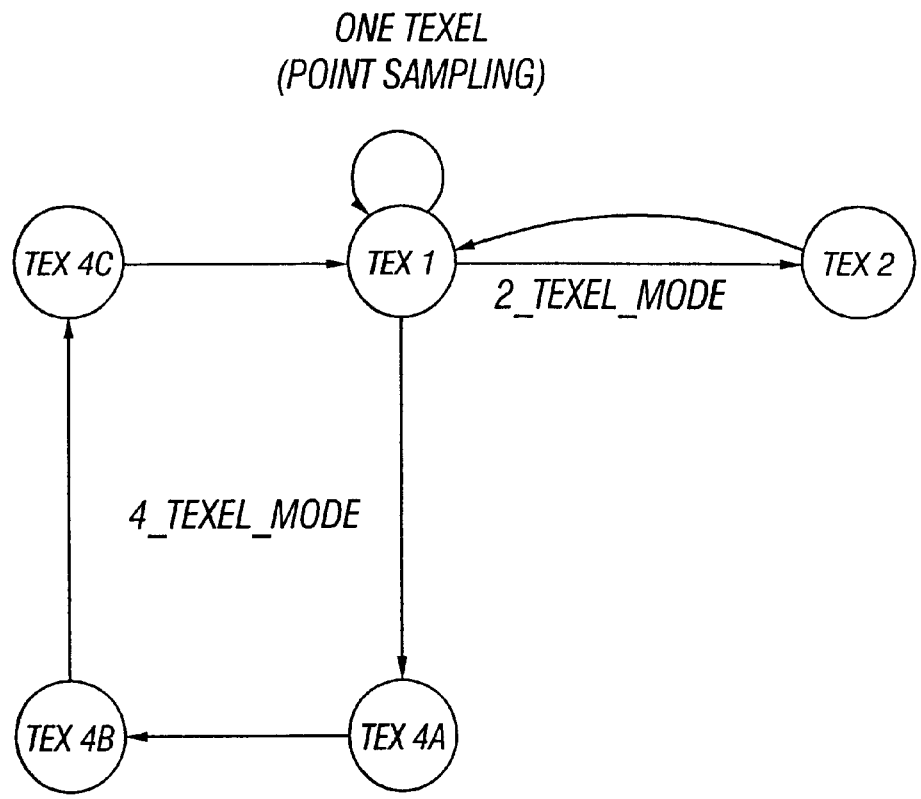
FIG. 8 shows the state machine of FIG. 4 constructed in accordance with the present invention.

Referring now to FIGS. 5 and 8, state machine 230 is shown to include states tex1, tex 2, tex 4a, tex 4b, and tex 4c. State machine 230 preferably directs the operation of the graphics system 100 to provide point sampling, two-texel averaging, and four-texel averaging. To provide these three texture mapping operations, state machine 230 includes three control paths. The control path followed is dictated by the position of the u, v coordinate within the nine regions. That region is determined by examination of signals u__all__0, u__all__1, v__all__0, and v__all__1, as explained above. To determine the appropriate control path, state machine 230 first determines if four-texel averaging is to be implemented by determining if the u, v coordinate is in region V. If it is not, the state machine checks to see if two-texel averaging is to be implemented by determining whether the coordinate resides in regions II, IV, VI, or VIII. If not, the state machine 230 infers that the u, v coordinate resides in region I, III, VII, or IX and initiates point sampling. State machine checks these conditions preferably in the order indicated above, the reason for which will become apparent below.

For four-texel averaging, the coordinate is in region v if none of the signals u__all__0, u__all__1, v__all__0, or v__all__1 are active (i.e., all four bits are logic 0 values). Equation (1) below includes the logic for assessing whether a coordinate is in region V:

$$4\_texel\_mode = !u\_all\_0 \text{ AND } !u\_all_1 \text{ AND } !v\_all\_0 \text{ AND } !v\_all\_1 \quad (1)$$

where 4__texel__mode is a signal that is active (preferably logic 1) when a u, v coordinate is in region V, thus indicating the need for four-texel averaging. The symbol "!" indicates the logical "NOT" operation.

Two-texel averaging is indicated if the u, v coordinate is in region II, IV, VI, or VIII. This determination is made when the 2__texel__mode signal in equation (2) below is a logic 1:

$$2\_texel\_mode = ![(u\_all\_0 \text{ OR } u\_all\_1) \text{ AND } (v\_all\_0 \text{ OR } v\_all\_1)]. \quad (2)$$

Upon examination of logic equation (2), the 2__texel__mode signal will be a logic 1 even if the coordinate resides in region V, normally requiring four-texel averaging. However, equation (1) is used to check for the four-texel averaging mode and based on the priority discussed above, equation (1) is preferred before equation (2) and thus, 4__texel__mode will become active and equation (2) will not be performed. Point sampling is indicated for regions I, III, VII, or IX. Point sampling is inferred after equation (1) indicates that the coordinate is not in region v and equation (2) indicates that the coordinate is not in regions II, IV, VI, or VIII.

Referring to FIGS. 4, 5, and 8, state machine 230 begins in state tex1. If the 4__texel__mode signal is asserted on control passes to state tex 4a in which the first of the four nearest texels to be averaged is retrieved from texture memory 350 and an associated scale factor is computed by math logic 240. Control then passes to state tex 4b in which the second texel is obtained from texture memory and a second scale factor is computed. Control then passes to state tex 4c where the third texel is retrieved and its scale factor is computed. Finally, control passes back to state tex 1 where the fourth texel to be averaged is retrieved and its scale factor is computed. At this point, the scaled average of the four retrieved texels is computed by selectable mode filter 400 and provided as the texel__out value.

If the 4__texel__mode signal was inactive indicating that the coordinate was not in region V, 2__texel__mode is computed and if true (indicating the need for two-texel averaging) control passes from initial state tex 1 to state tex 2. In state tex 2, the first of two texels to be averaged is retrieved from texture memory and an associated scale factor is computed by math logic 240. Control then passes back to state tex 1 and the second texel is retrieved and its associated scale factor is computed. At this point, the scaled average of the two retrieved texels is computed by selectable mode filter 400 and provided as the texel__out value.

If neither 4__texel__mode or 2__texel__mode signals is asserted, then point sampling is performed. State machine 230 loops from state tex 1 back to state tex 1 and retrieves the closest texel to the u, v coordinate. No texel averaging is necessary in point sampling and the texel retrieved is the texel used to render the pixel.

Figure 9:
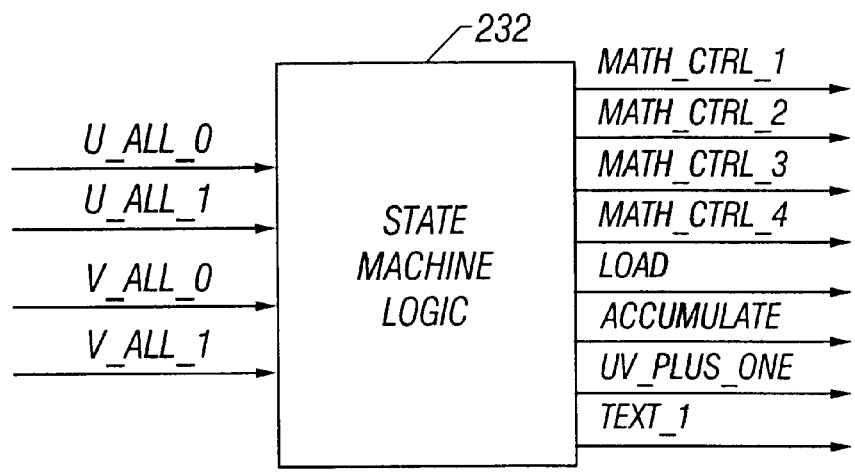
FIG. 9 shows input and output signals to the state machine logic of the state machine of FIG. 4.
Figure 10:
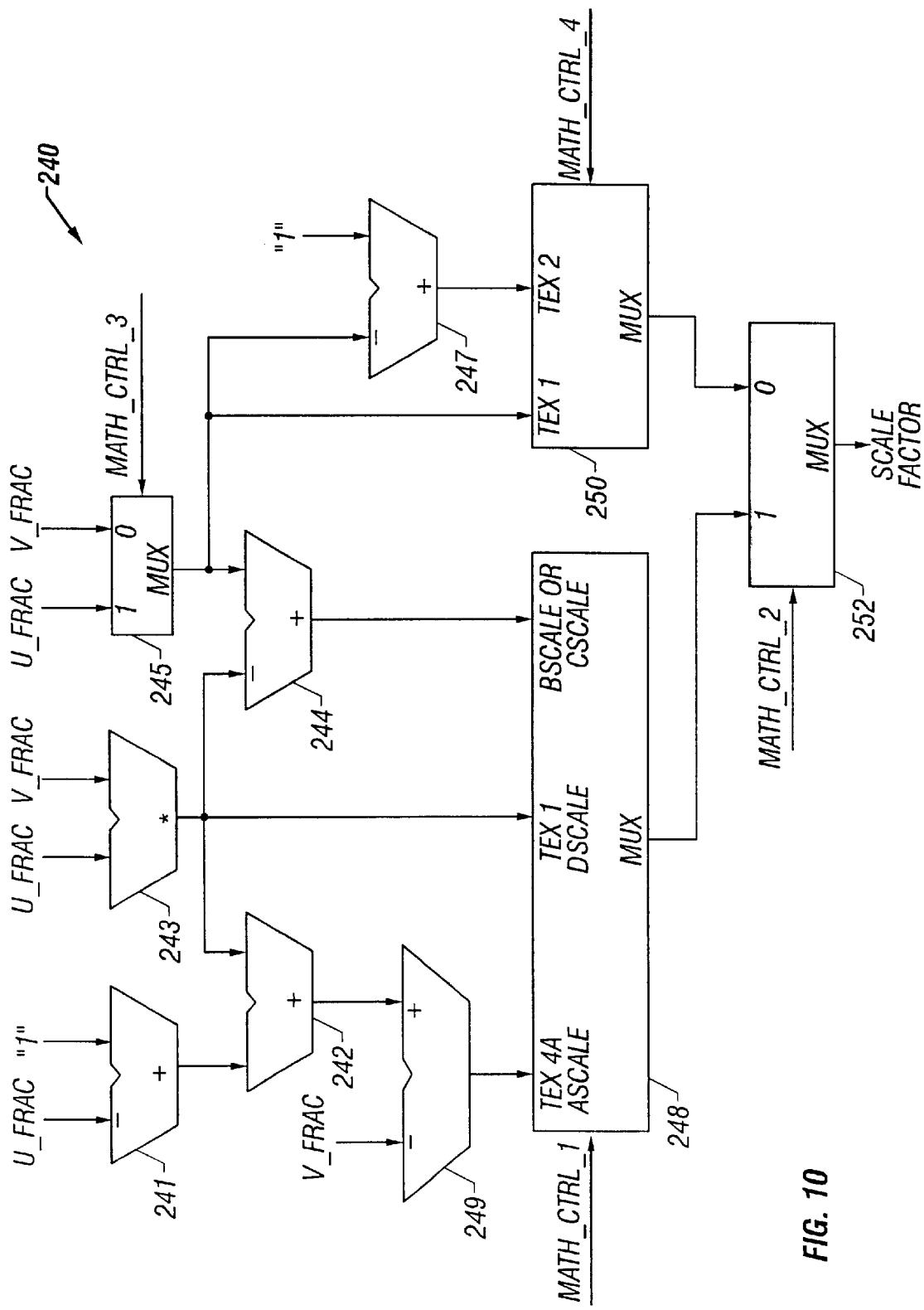
FIG. 10 shows the math logic of FIG. 4 constructed in accordance with the present invention.

Referring now to FIGS. 9 and 10, math logic 240, under control of state machine logic 232, is shown for computing the scale values used during two and four-texel averaging math logic 240 preferably includes adders 241, 242, 249, multipliers 243 and multiplexers 245, 248, 250, 252 The math__ctrl__1, math__ctrl__2, math__ctrl__3, and math__ctrl__4 control signals from state machine logic 232 are used to control the four multiplexers 245, 248, 250, and 252. The load, accumulate, tex_1, and uv_plus_one signals from state machine logic 232 are used with regard to selectable mode filter 400 and u, v address calc 260 (FIG. 4), as will be explained below.

Math logic 240 computes scale values for two and four-texel averaging. The four-texel averaging equation preferably is:

$$4\_texel\_average = A*A_{scale} + B*B_{scale} + C*C_{scale} + D*D_{scale} \quad (3)$$

where 4_texel_average is the averaged or bilinearly filtered value of texels A, B, C, and D scaled by the scale values $A_{scale}$, $B_{scale}$, $C_{scale}$, and $D_{scale}$. The four scale values are functions of u_frac and v_frac as follows:

$$A_{scale} = 1 - u\_frac - v frac + u\_frac*v\_frac \quad (4)$$

$$B_{scale} = u\_frac - u\_frac*v\_frac \quad (5)$$

$$C_{scale} = v\_frac - u\_frac*v\_frac \quad (6)$$

$$D_{scale} = u\_frac*v\_frac \quad (7)$$

Two-texel averaging is considerably simpler, although four different pairs of texels A/B, A/C, B/D, C/D are potentially subject to being averaged to produce a texel value for a u, v coordinate in regions II, IV, VI, or VIII. Table V includes all combinations of two-texel averaging possible for the four texels of FIG. 2 along with the averaging and scale factor equations for each texel pair.

TABLE V

Two-Texel Averaging

| Texels to be Averaged | Averaging Equation | Scale Factor | Scale Factor |
|---|---|---|---|
| A and B | $A*A_{scale} + B*B_{scale}$ | $A_{scale} = 1 - u\_frac$ | $B_{scale} = u\_frac$ |
| A and C | $A*A_{scale} + B*B_{scale}$ | $A_{scale} = 1 - v\_frac$ | $C_{scale} = v\_frac$ |
| B and D | $B*B_{scale} + D*D_{scale}$ | $B_{scale} = 1 - v\_frac$ | $D_{scale} = v\_frac$ |
| C and D | $C*C_{scale} + D*D_{scale}$ | $C_{scale} = 1 - u\_frac$ | $D_{scale} = u\_frac$ |

The logic in FIG. 10 performs the calculations of the scale factors shown above in equations 4–7 and in Table V. Math logic 240 includes adders 241, 242, 249 and multiplier 243 for computing the $A_{scale}$ value shown in equation (4) for four-texel averaging. Adder 241 includes an inverting input for receiving the u_frac input signal and also includes a logic "1" (preferably binary 00000001) as the other input value. Adder 241 thus computes the term 1+(−u_frac), or 1−u_frac. The output of multiplier 243 provides the term u_frac*v_frac and adder 242 produces the term 1−u_frac+u_frac*v_frac. Adder 249 then subtracts v_frac from the output signal from adder 242 to provide the complete $A_{scale}$ value for equation (4).

The $B_{scale}$ and $C_{scale}$ values from equations (5) and (6) include the common multiplier term of −u_frac*v_frac. This common term is provided by multiplier 243. The output of multiplier 243 is then subtracted from the output of multiplexer 245 by adder 244. Multiplexer 245 receives as its input signals u_frac and v_frac. State machine logic 232 (FIG. 9) by way of the math_ctrl_3 signal dictates whether the output signal of multiplexer is u_frac or v_frac. Thus, the state machine logic activates the math_ctrl_3 signal to select either u_frac when $B_{scale}$ is to be calculated (during state tex 4b in FIG. 8) or v_frac when $C_{scale}$ is to be calculated (during state 4c). Finally, the $D_{scale}$ value in equation (7) is simply the product of u_frac and v_frac which is provided by multiplier 243.

Multiplexer 248 is controlled by a control signal math_ctrl_1 from state machine logic 232. Math_ctrl_1 which may comprise multiple bits, selects as an output for the multiplexer 248 one of the three input signals. The output of multiplexer 248 is provided to multiplexer 252. Thus, during the appropriate states of the control loop including tex 4a, tex 4b, tex 4c, and tex 1 (FIG. 8), state machine logic controls multiplexer 248 to provide the $A_{scale}$, $B_{scale}$, $C_{scale}$, and $D_{scale}$ to multiplexer 252.

The combination of multiplexer 245 and adder 247 generates the scale factors necessary for two-texel averaging shown in third and fourth columns of Table V. The scale factors in the third column are all in the form of 1−X, where X is either u_frac or v_frac. At the appropriate time during the state diagram of FIG. 8, multiplexer 245 selects either u_frac or v_frac which is then provided to an inverting input of adder 247. Which fractional coordinate value, u_frac or v_frac, is selected depends on which texels A, B, C, and D are to be averaged as described by the averaging equations in Table V. Adder 247 is also provided with a "1" input signal (or "00000001" in eight bit form) and thus calculates 1−X. The scale factors in the fourth column of Table v are either u_frac or v_frac with not further computation required.

The output of multiplexer 245 and adder 247 are provided to multiplexer 250. Multiplexer 250 is controlled by the control signal math_ctrl_4 from state machine logic 232. Multiplexer 250 preferably provides the term 1−X followed by the value X, where X is either u_frac or v_frac. The output from multiplexer 250 is transmitted to multiplexer 252. Thus, the output signals from multiplexer 250 includes the two-texel averaging scale factors shown in Table V.

Multiplexer 252 is controlled by the control signal math_ctrl_2 signal from by state machine logic 232. The state of the math_ctrl_2 signal determines whether the output signal from either multiplexer 248 or multiplexer 250 is to be provided as the scale factor, thereby either selecting a four-texel scale factor or a two-texel scale factor. Moreover, the output signal from multiplexer 252 is a series of scale factors for either two or four-texel averaging. If two-texel averaging is desired, two scale factors are produced. If four-texel averaging is desired, four scale factors are produced. The timing of the multiplexers in math logic 240 is controlled by the control signals provided by state machine logic 232 generally according to the state machine diagram of FIG. 8.

Figure 11:
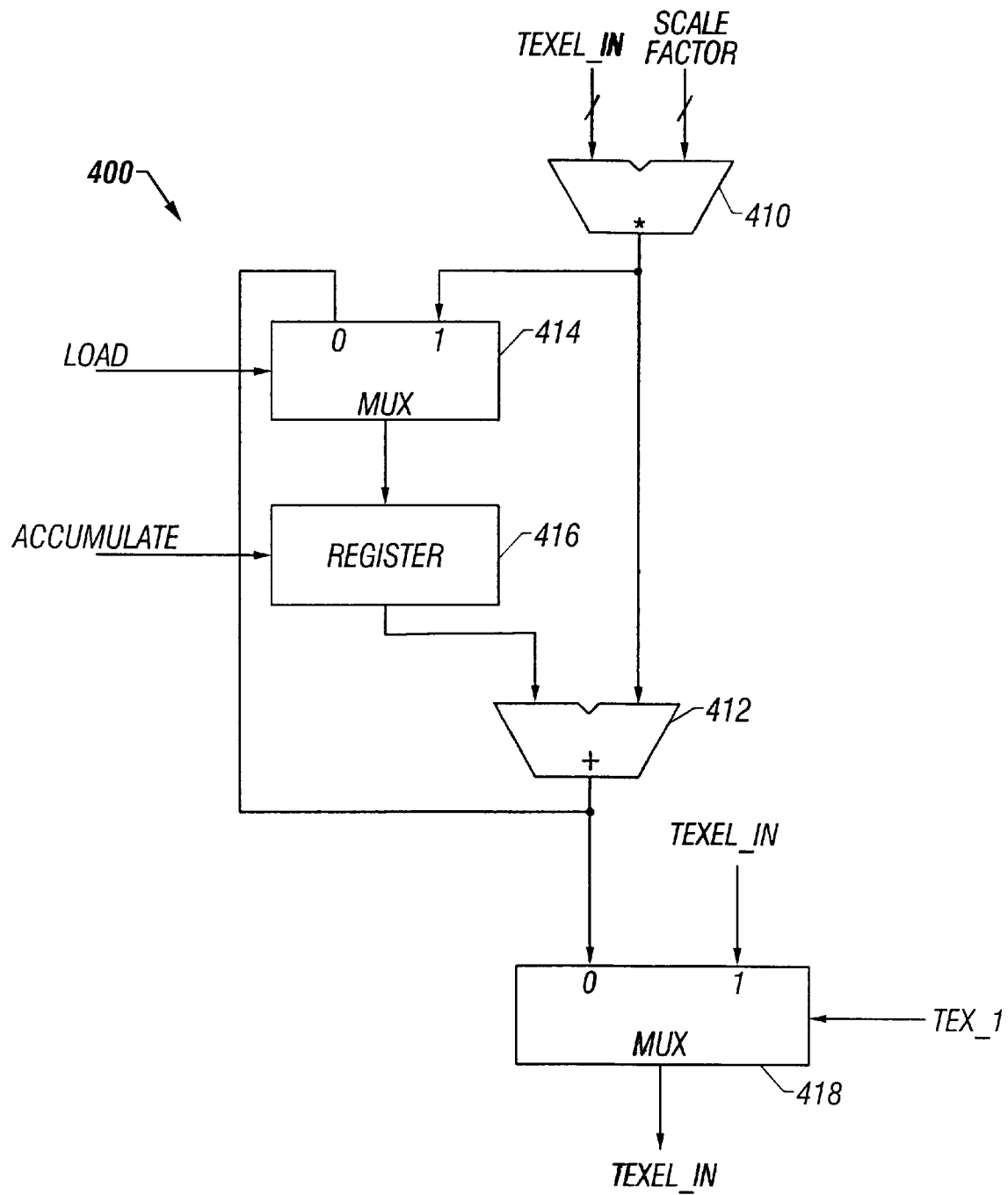
FIG. 11 is a schematic diagram of the selectable mode filter of FIG. 3 constructed in accordance with the present invention.

Referring now to FIGS. 4, 5, and 11, the selectable mode filter 400 preferably includes multiplier 410, adder 412, multiplexers 414, 418 and accumulator register 416. The inputs to the filter 400 include the texel_in and scale factors, as well as the load and accumulate control signals. The texel_in value is retrieved from texture memory 350 (FIG. 3) and represents a texel value either to be averaged (during two or four-texel filtering) or to be used to render the pixel (during point sampling texture mapping). Selectable mode filter 400 generally performs adding and accumulating functions to perform the averaging operations of equation (3) and Table V. At substantially the same time that a texel value is retrieved from texture memory 350, an appropriate scale factor is provided by math logic 240 during either two or four texel-averaging. Multiplier 410 multiplies the texel value by its scale factor. The output of multiplier 410 is provided to multiplexer 414 and selected as the output signal for multiplexer 414 output by the load control signal, which is generated by state machine logic 232 (FIG. 9). The first texel*scale value from multiplier 410 is then loaded into accumulator register 416 when the accumulate signal, provided by state machine logic 232, is asserted. At this point, the first term in the averaging equation, such as $A*A_{scale}$ from equation (3), is loaded into the accumulator register 416. For each of the next two terms during four-texel averaging (terms 2 and 3), multiplier 410 multiplies the texel_in value by the associated scale factor and the resulting product is added to the current contents of the accumulator register by adder 412. The resulting sum of adder 412 is loaded through multiplexer 414 and stored in accumulator register 416.

When the fourth texel*scale value during four-texel averaging (or the second value during two-texel averaging) is computed by multiplier 410, it is added to the current contents of accumulator register 416 and provided as the output_texel out value from multiplexer 418 under control by the tex_1 signal. Thus tex_1 is asserted by state machine logic 232 to select the output signal from adder 412 during two or four texel averaging.

If, instead, point sampling is required (i.e., no averaging required), the texel_in value, which is also provided directly to multiplexer 418 is selected by state machine logic 232 via the tex_1 control signal. Texel_in during point sampling is simply the closest pixel to the u, v coordinate generated by texture map address generator 150. Because no averaging is needed, the texel_out value is selected by state machine logic 232 to be the texel_out value.

The invention described above may also be embodied in software. An exemplary software listing is included in Appendix A. The software listing of Appendix A includes two sections. The software in section I determines the region to which the texel coordinate corresponds (FIG. 2). Section II includes software that implements point sampling, two-texel averaging, or four-texel averaging. The software of section II responds to the result of the execution of the section I software and implements the appropriate filtering technique.

Referring first to the software of section I, the subroutine determine_fil_passes determines to which of nine regions I–IX the fractional u,v texel coordinate corresponds. The first portion of this routine, reproduced below in lines (8)–(27), sets the flags uf0, uf1, vf0, and vf1 in accordance with which region the fractional texel coordinate corresponds.

```
uf0 = ((u >> 8) & ~fr_mask) & 0xff;        (8)
if(!uf0)                                    (9)
    uf0 = 1;                                (10)
else                                        (11)
    uf0 = 0;                                (12)
vf0 = ((v >> 8) & ~fr_mask) & 0xff;         (13)
if(!vf0)                                    (14)
    vf0 = 1;                                (15)
else                                        (16)
    vf0 = 0;                                (17)
uf1 = ((u >> 8) | fr_mask) & 0xff;          (18)
if(uf1 == 0xff)                             (19)
    uf1 = 1;                                (20)
else                                        (21)
    uf1 = 0;                                (22)
vf1 = ((v >> 8) | fr_mask) & 0xff;          (23)
if(vf1 == 0xff)                             (24)
    vf1 = 1;                                (25)
else                                        (26)
    vf1 = 0;                                (27)
```

Software lines (8)–(12) determine on which side of dashed dividing line 202a (FIG. 2) the fractional u,v coordinate is located, determined by lines (8)–(9). If the coordinate lies to the left of dividing line 202a (i.e., regions I, IV, or VII), the uf0 flag is set to a value of "1" in line (10). Otherwise, for u,v coordinates to the right of dividing line 202a (regions II, III, V, VI, VIII, or IX), uf0 is set to a value of "0".

Software lines (13)–(17) determine on which side of dashed dividing line 203a the fractional u,v coordinate is located, determined by lines (13)–(14). If the coordinate lies above dividing line 203a (i.e., in regions I–III), the vf0 flag is set to a value of "1" in line (15). Otherwise, for u,v coordinates below dividing line 203a (regions IV–IX), vf0 is set to a value of "0".

Software lines (18)–(22) determine on which side of dashed dividing line 202b the fractional u,v coordinate is located, determined by lines (18)–(19). If the coordinate lies to the right of dividing line 202b (i.e., in regions III, VI, or IX), the uf1 flag is set to a value of "1" in line (20). Otherwise, for u,v coordinates to the left of dividing line 203a (regions I, II, IV, V, VII, or VIII), uf1 is set to a value of "0".

Software lines (23)–(27) determine on which side of dashed dividing line 203b the fractional u,v coordinate is located, determined by lines (23)–(24). If the coordinate lies below dividing line 203b (i.e., in regions VII–IX), the vf1 flag is set to a value of "1" in line (25). Otherwise, for u,v coordinates above dividing line 203b (regions I–VI), vf1 is set to a value of "0".

The flag uf0 is 1 if the u,v coordinate is to the left of dividing line 202a and 0 otherwise. The flag uf1 is 1 if the u,v coordinate is the right of dividing line 202b and 0 otherwise. Accordingly, the software can determine in which of three regions created by vertical dividing lines 202a and 202b the fractional texel coordinate is located by examining the uf0 and uf1 flags. The flag vf0 is 1 if the u,v coordinate is above dividing line 203a and 0 otherwise. The flag vf1 is 1 if the u,v coordinate is below dividing line 203b and 0 otherwise. Accordingly, the software can determine in which of three regions created by horizontal dividing lines 203a and 203b the fractional texel coordinate is located by examining the vf0 and vf1 flags. Thus, by examining the flags uf0, uf1, vf0, and vf1 it can be determined in which of the nine regions (I–IX) in FIG. 2 the fractional u,v coordinate is located.

Subroutine determine_fil_passes first determines if the texel coordinate corresponds to region V in which four texel values are to be averaged together. The following lines of code (28)–(35) make this determination by logically AND-ing together the flags uf0, uf1, vf0, and vf1 (line (28)).

```
/* First determine region five */
    if((uf0 == 0) && (uf1 == 0) && (vf0 == 0) && (vf1 == 0))   (28)
    {                                                           (29)
        f_p = 4;                                                (30)
        up[0] = 0; vp[0] = 0;                                   (31)
        up[1] = 1; vp[1] = 0;                                   (32)
        up[2] = 0; vp[2] = 1;                                   (33)
        up[3] = 1; vp[3] = 1;                                   (34)
    }                                                           (35)
```

If all four of the values uf0, uf1, vf0, and vf1 are 0, then the texel coordinate is located in region V. Accordingly, the variable f_p is set to a value of 4 to indicate that a four-texel average is to be computed by the software in section II. In lines (31)–(35) eight offset values (up[0 . . . 4] and vp[0 . . . 4]) are calculated that will subsequently be used to compute the address of each of the four texels to be averaged. Referring to FIG. 2, the software determines the coordinate of the upper left-hand texel (texel A) in the group of four nearest texels to the fractional u,v coordinate (coordinate P3, for example). Once the coordinate for texel A is known, the coordinates of three remaining texels B, C, and D are easily computed by adding either 0 or 1 to the u and v coordinate of texel A. Accordingly, the values up and vp represent the offset values used to compute the other three texels. These offset values up and vp are further described below.

If the texel coordinate is not located in region V, then lines (36)–(55) determine whether the coordinate is in one of the corner regions I, III, VII, or IX for which point sampling is implemented.

```
/* Next determine regions 1, 3, 7 and 9 */
    /* Region 1 */
    else if ((uf0 == 1) && (vf0 == 1))                      (36)
    {                                                        (37)
        f_p = 1;                                             (38)
        up[0] = 0; vp[0] = 0;                                (39)
    }                                                        (40)
    /* Region 3 */
    else if ((uf1 == 1) && (vf0 == 1))                      (41)
    {                                                        (42)
        f_p = 1;                                             (43)
        up[0] = 1; vp[0] = 0;                                (44)
    }                                                        (45)
    /* Region 7 */
    else if ((uf0 == 1) && (vf1 == 1))                      (46)
    {                                                        (47)
        f_p = 1;                                             (48)
        up[0] = 0; vp[0] = 1;                                (49)
    }                                                        (50)
    /* Region 9 */
    else if ((uf1 == 1) && (vf1 == 1))                      (51)
    {                                                        (52)
        f_p = 1;                                             (53)
        up[0] = 1; vp[0] = 1;                                (54)
    }                                                        (55)
```

Lines (36), (41), (46), and (51) determine whether the texel coordinate is region I, II, VII, or IX respectively. If the texel coordinate is located in one of these point sampling regions, then, in lines (38), (43), (48), or (53), the f_p variable is set to a value of 1 to indicate that only one texel is to be selected (i.e., no averaging). The offset values up and vp are computed in lines (38), (44), (49), (54) and are subsequently used, as described below, to compute the coordinate of the texel to be selected as the point sampled texel value.

If the texel coordinate is not located in regions I, III, V, VII, or IX, as determined by lines (28), (36), (41), (46), and (51) above, then the coordinate must correspond to one of the two-texel averaging regions, II, IV, VI, or VIII. Lines (56)–(79) determine to which of the two-texel averaging regions the coordinate corresponds.

```
/* Region 2 */
    else if ((uf0 == 0) && (uf1 == 0) && (vf0 == 1))         (56)
    {                                                         (57)
        f_p = 2;                                              (58)
        up[0] = 0; vp[0] = 0;                                 (59)
        up[1] = 1; vp[1] = 0;                                 (60)
    }                                                         (61)
    /* Region 8 */
    else if ((uf0 == 0) && (uf1 == 0) && (vf1 == 1))         (62)
    {                                                         (63)
        f_p = 2;                                              (64)
        up[0] = 0; vp[0] = 1;                                 (65)
        up[1] = 1; vp[1] = 1;                                 (66)
    }                                                         (67)
    /* Region 4 */
    else if ((vf0 == 0) && (vf1 == 0) && (uf0 == 1))         (68)
    {                                                         (69)
        f_p = 2;                                              (70)
        up[0] = 0; vp[0] = 0;                                 (71)
        up[1] = 0; vp[1] = 1;                                 (72)
```

```
    }                                                         (73)
    /* Region 6 */
    else if ((vf0 == 0) && (vf1 == 0) && (uf1 == 1))         (74)
    {                                                         (75)
        f_p = 2;                                              (76)
        up[0] = 1; vp[0] = 0;                                 (77)
        up[1] = 1; vp[1] = 1;                                 (78)
    }                                                         (79)
```

Lines (56), (62), (68), and (74) determine whether the texel coordinate corresponds to regions 2, 8, 4, or 6, respectively. If the coordinate is located in any of these regions, the f_p variable is set to a value of 2 in lines 58, 64, 70, or 76 to indicate that a two-texel average is to be computed. The offsets up and vp are computed in lines 59–60, 66–67, 72–73, 78–79 and are subsequently used to compute the coordinates for the two texels to be averaged together.

As described above, subroutine determine_fil_passes determines to which of the nine regions the texel coordinate corresponds. Once the region is determined, determine_fil_passes sets the f_p variable to indicate whether a two- or four-texel average is to be computed or whether point sampling is to be implemented instead. An f_p value of 1 indicates point sampling is to be implemented. An f_p value of 2 indicates two-texel averaging is to be implemented and an f_p value of 4 indicates four-texel averaging.

Turning to the software of Appendix A, section II, the determine_fil_passes subroutine is called with the instruction:

$$fil\_passes = determine\_fil\_passes(v\_pos, u\_pos, frac\_mask, vp, up); \quad (80)$$

Thus, the variable f_p from determine_fil_passes is returned as the variable fil_passes. The section II software implements point sampling, two-texel averaging, or four-texel averaging depending on the value of the fil_passes variable from line (80). The following lines of code (81)–(99) from the section II software (Appendix A) implements point sampling of texels from a texture map.

```
    if (fil_passes == 1)                                      (81)
    {                                                         (82)
        switch (texture_mode)                                 (83)
        {                                                     (84)
            case TEXTURE_LINEAR:                              (85)
                vp[0] = ((v_pos >> 16) + vp[0]) & tex_lin.vmask;  (86)
                up[0] = ((u_pos >> 16) + up[0]) & tex_lin.umask;  (87)
                break;                                        (88)
            case TEXTURE_PERSPECTIVE:                         (89)
                vp[0] = ((v_pos >> 16) + vp[0]) & tex_persp.vmask;  (90)
                up[0] = ((u_pos >> 16) + up[0]) & tex_persp.umask;  (91)
                break;                                        (92)
        }                                                     (93)
        tex_mask = 1; tex_cc_mask = 1;                        (94)
        read_tex_memory (vp[0], up[0]);                       (95)
        set_tex_color_compare_flags ();                       (96)
        tex_mask_local[0] = tex_mask & tex_cc_mask;           (97)
        tex_mask = tex_cc_mask = tex_mask_local[0];           (98)
    }                                                         (99)
```

The "if" instruction in line (81) determines whether point sampling is to be implemented by ascertaining whether fil_passes equals 1. If fil_passes does equal 1, then lines (82)–(99) are executed to implement point sampling. Depending on whether linear texture mapping is desired (determined by line (85)) or perspective texture mapping is desired (determined by line (89)), the software calculates the coordinate of the texel to be selected from the texture map in lines (86)–(87) and (90)–(91). As shown, the coordinate is calculated by shifting by 16 bits the (upos, vpos), which is the integer and fractional coordinate of the upper left texel of the four nearest texels (texel A in FIG. 2). This bit shift makes the integer portions of the (upos, vpos) coordinate the least significant 16 bits (assuming the coordinate was in the 10.16 format with 10 bits of integer coordinate and 16 bits of fractional coordinate). The bit-shifted value is then added to up[0] and vp[0] which were calculated from the determine_fil_passes subroutine explained above. That result is logically ANDed with any suitable mask value.

In line (95) the texel value at the texture map address (vp[0], up[0]) is read from memory and subsequently used to render the pixel at the corresponding (x,y) address.

The following lines of software, (100)–(165), compute a two-texel average for fractional texel coordinates located in regions II, IV, VI, and VIII of FIG. 2. The instruction in line (100) determines whether fil_passes is 2 and if so (indicating a two-texel average is to be computed), lines (101)–(165) are executed.

```
        else if (fil_passes == 2)                                          (100)
        {                                                                  (101)
                switch (texture_mode)                                      (102)
                {                                                          (103)
                        case TEXTURE_LINEAR:                               (104)
                                for (i=0; i<fil_passes; i++)               (105)
                                {                                          (106)
                                        vp[i] = ((v_pos >> 16) + vp[i]) & tex_lin.vmask;   (107)
                                        up[i] = ((u_pos >> 16) + up[i]) & tex_lin.umask;   (108)
                                }                                          (109)
                        break;                                             (110)
                        case TEXTURE_PERSPECTIVE:                          (111)
                                for (i=0; i<fil_passes; i++)               (112)
                                {                                          (113)
                                        vp[i] = ((v_pos >> 16) + vp[i]) & tex_persp.vmask; (114)
                                        up[i] = ((u_pos >> 16) + up[i]) & tex_persp.umask; (115)
                                }                                          (116)
                        break;                                             (117)
        }                                                                  (118)
```

Lines (104)–(117) above calculate the coordinates of the two texels to be averaged for either linear texture mapping (lines (104)–(110)) or perspective texture mapping (lines (111)–(117)). These coordinates are calculated by shifting by 16 bits the (upos, vpos) coordinate and adding the up[i] and vp[i] values. That result is then logically ANDed with a suitable mask value.

```
        for (i=0; i<fil_passes; i++)                                       (119)
        {                                                                  (120)
                tex_mask = 1; tex_cc_mask = 1;                             (121)
                read_tex_memory (vp[i], up[i]);                            (122)
                set_tex_color_compare_flags ();                            (123)
                tex_mask_local[i] = tex_mask & tex_cc_mask;                (124)
                if (tex_mask_local[i])                                     (125)
                {                                                          (126)
                        ttr[i] = tr_pe;                                    (127)
                        ttg[i] = tg_pe;                                    (128)
                        ttb[i] = tb_pe;                                    (129)
                        tta[i] = ta_pe;                                    (130)
                }                                                          (131)
                else                                                       (132)
                {                                                          (133)
                        ttr[i] = 0;                                        (134)
                        ttg[i] = 0;                                        (135)
                        ttb[i] = 0;                                        (136)
                        tta[i] = 0;                                        (137)
                }                                                          (138)
        }                                                                  (139)
        if ((uf0 == 0) && (uf1 == 0))                                      (140)
                frac = (u_pos >> 8) & 0xff;                                (141)
        else                                                               (142)
                frac = (v_pos >> 8) & 0xff;                                (143)
        if (enable_step_frac)                                              (144)
                frac &= ~frac_mask;                                        (145)
        if (enable_frac_munge)                                             (146)
        {                                                                  (147)
                // The multiplication by 0xfe is done to match hw          (148)
                frac = (((4 * frac) - 0x100) >> 1) & 0xfe;                 (149)
        }                                                                  (150)
        frac_munge_1 = 0x100 - frac;                                       (151)
        frac_munge_2 = frac;                                               (152)
```

The frac_munge_1 and frac_munge_2 values represent the scale factors for two-texel averaging listed in Table V above. Lines (153)–(161) compute the two-texel average for the red, green, and blue components of the texel value. If desired, a two-texel average for an alpha component can be calculated as shown in line (157).

```
    // printf ("frac:%x sc_2p:%x\n", frac, sc_2p);                              (153)
    tr_pe = (((ttr[0] >> 8) * frac_munge_1) >> 4) +
            (((ttr[1] >> 8) * frac_munge_2) >> 4);                              (154)
    tg_pe = (((ttg[0] >> 8) * frac_munge_1) >> 4) +
            (((ttg[1] >> 8) * frac_munge_2) >> 4);                              (155)
    tb_pe = (((ttb[0] >> 8) * frac_munge_1) >> 4) +
            (((ttb[1] >> 8) * frac_munge_2) >> 4);                              (156)
    ta_pe = (((tta[0] >> 8) * frac_munge_1) >> 4) +
            (((tta[1] >> 8) * frac_munge_2) >> 4);                              (157)
    tr_pe <<= 4;                                                                (158)
    tg_pe <<= 4;                                                                (159)
    tb_pe <<= 4;                                                                (160)
    ta_pe <<= 4;                                                                (161)
    tex_mask = (tex_mask_local[0] * frac_munge_1) +
               (tex_mask_local[1] * frac_munge_2);                              (162)
    tex_cc_mask = decode_tex_mask (tex_mask_threshold_encoding, tex_mask);      (163)
    tex_mask = tex_cc_mask;                                                     (164)
}                                                                               (165)
```

The following lines of software, (166)–(234), compute a four-texel average for fractional texel coordinates located in region V of FIG. 2. The instruction in line (166) determines whether fil_passes is 4 and if so (indicating a four-texel average is to be computed), lines (167)–(234) are executed.

```
            else if (fil_passes == 4)                                           (166)
            {                                                                   (167)
                switch (texture_mode)                                           (168)
                {                                                               (168)
                    case TEXTURE_LINEAR:                                        (169)
                        for (i=0; i<fil_passes; i++)                            (170)
                        {                                                       (171)
                            vp[i] = ((v_pos >> 16) + vp[i]) & tex_lin.vmask;    (172)
                            up[i] = ((u_pos >> 16) + up[i]) & tex_lin.umask;    (173)
                        }                                                       (174)
                    break;                                                      (175)
                    case TEXTURE_PERSPECTIVE:                                   (176)
                        for (i=0; i<fil_passes; i++)                            (177)
                        {                                                       (178)
                            vp[i] = ((v_pos >> 16) + vp[i]) & tex_persp.vmask;  (179)
                            up[i] = ((u_pos >> 16) + up[i]) & tex_persp.umask;  (180)
                        }                                                       (181)
                    break;                                                      (182)
break;                                                                          (183)
                }                                                               (184)
```

Lines (169)–(184) above calculate the coordinates of the four texels to be averaged for either linear texture mapping (lines (169)–(175)) or perspective texture mapping (lines (176)–(183)). These coordinates are calculated by shifting by 16 bits the (upos, vpos) coordinate and adding the up[i] and vp[i] values. That result is then logically ANDed with a suitable mask value.

```
            for (i=0; i<fil_passes; i++)                                        (185)
            {                                                                   (186)
                tex_mask = 1; tex_cc_mask = 1;                                  (187)
                read_tex_memory (vp[i], up[i]);                                 (188)
                set_tex_color_compare_flags ();                                 (189)
                tex_mask_local[i] = tex_mask & tex_cc_mask;                     (190)
                if (tex_mask_local[i])                                          (191)
```

```
        {                                           (192)
            ttr[i] = tr_pe;                         (193)
            ttg[i] = tg_pe;                         (194)
            ttb[i] = tb_pe;                         (195)
            tta[i] = ta_pe;                         (196)
        }                                           (197)
        else                                        (198)
            ttr[i] = 0;                             (199)
            ttg[i] = 0;                             (200)
            ttb[i] = 0;                             (201)
            tta[i] = 0;                             (202)
        }                                           (203)
    }                                               (204)
    u_frac = (u_pos >> 8) & 0xff;                   (205)
    v_frac = (v_pos >> 8) & 0xff;                   (206)
    if (enable_frac_munge)                          (207)
    {                                               (208)
        // The multiplication by 0xfe is done to match hw
        u_frac = (((4 * u_frac) - 0x100) >> 1) & 0xfe;  (209)
        v_frac = (((4 * v_frac) - 0x100) >> 1) & 0xfe;  (210)
    }                                               (211)
    if (enable_step_frac)                           (212)
    {                                               (213)
        u_frac &= ~frac_mask;                       (214)
        v_frac &= ~frac_mask;                       (215)
    }                                               (216)
```

The u_frac and v_frac values computed above in lines (209) and (210) are used to compute the scale factors described previously with respect to equations (4)–(7). Computation of the scale factors is shown below in lines (217)–(221). The value ufvf represents the product of u_frac and v_frac and is used to compute the scale factors as, bs, cs, and ds in lines (218), (219), (220), and (221), respectively.

```
    ufVf = ((u_frac * v_frac)>>8) & 0xff;           (217)
    as = (0x100-u_frac)-v_frac + ufvf;              (218)
    bs = u_frac - ufvf;                             (219)
    cs = v_frac - ufvf;                             (220)
    ds = ufvf;                                      (221)
    tr_pe = (((ttr[0]>>8) * as) >>4) +
            (((ttr[1]>>8) * bs) >>4) +
            (((ttr[2]>>8) * cs) >>4) +
            (((ttr[3]>>8) * ds) >>4);
    (222)
    tg_pe = (((ttg[0]>>8) * as) >>4) +
            (((ttg[1]>>8) * bs) >>4) +
            (((ttg[2]>>8) * cs) >>4) +
            (((ttg[3]>>8) * ds) >>4);               (223)
    tb_pe = (((ttb[0]>>8) * as) >>4) +
            (((ttb[1]>>8) * bs) >>4) +
            (((ttb[2]>>8) * cs) >>4) +
            (((ttb[3]>>8) * ds) >>4);               (224)
    ta_pe = (((tta[0]>>8) * as) >>4) +
            (((tta[1]>>8) * bs) >>4) +
            (((tta[2]>>8) * cs) >>4) +
            (((tta[3]>>8) * ds) >>4);               (225)
    tr_pe <<= 4;                                    (226)
    tg_pe <<= 4;                                    (227)
    tb_pe <<= 4;                                    (228)
    ta_pe <<= 4;                                    (229)
```

Lines (222)–(229) compute the four-texel average for the red (line (222)), green (line (223)), and blue (line (224)) components of the texel value to be used when rendering the associated pixel. In addition, an averaged alpha component may also be computed as shown in line (225).

```
    tex_mask = (tex_mask_local[0]* as) +
               (tex_mask_local[1] * bs) +
               (tex_mask_local[2] * cs) +
               (tex_mask_local[3] * ds);            (230)
        tex_cc_mask = decode_tex_mask (tex_mask_threshold_encoding, tex_mask);  (231)
        tex_mask = tex_cc_mask;                     (232)
    }                                               (233)
}                                                   (234)
```

While several preferred embodiments of the invention have been shown and described, modifications thereof can be made by one skilled in the art without departing from the spirit of the invention.

APPENDIX A

Software Listing

Section I
int determine_fil_passes (int v, int.u, unsigned fr_mask, int *vp, int *up)
{
    int f_p;
    uf0 = ((u>>8) & ~fr_mask) & 0xff;
    if (!uf0)
        uf0 = 1;
    else
        uf0 = = 0;
    vf0 = ((v>>8) & ~fr_mask) & 0xff;
    if(!vf0)
        vf0 = 1;
    else
        vf0 = 0;
    uf1 = ((u>>8) | fr_mask) & 0xff;
    if(uf1 == 0xff)

APPENDIX A-continued

Software Listing

```
        uf1 = 1;
else
        uf1 = 0;
vf1 = ((v>>8) | fr_mask) & 0xff;
if(vf1 = 0xff
        vf1 = 1;
else
        vf1 = 0;
/* First determine region five */
if((ufo == 0) && (uf1 == 0) && (vf0 == 0) && (vf1 == 0))
{
    f_p = 4;
    up[0] = 0; vp[0] = 0;
    up[1] = 1; vp[1] = 0;
    up[2] = 0; vp[2] = 1;
    up[3] = 1; vp[3] = 1;
}
/* Next determine regions 1, 3, 7 and 9 */.
/* Region 1*/
else if((uf0 == 1) && (vf0 == 1))
{
    f_p = 1;
    up[0] = 0; vp[0] = 0;
}
/* Region 3 */
else if((uf1 == 1) && (vf0 == = 1))
{
    f_p = 1;
    up[0]= 1;vp[0]= 0;
}
/* Region 7 */
else if((uf0 == 1) && (vfl == 1))
{
    f_p = 1;
    up[0]= 0; vp[0]= 1;
}
/* Region 9 */
else if((uf1 = 1) && (vf1 == 1))
{
    f_p = 1;
    up[0] = 1; vp[0] = 1;
}
/* Finally - the two pass regions */
/* Region 2 */
else if((uf0 == 0) && (uf1 == 0) && (vf0 == 1))
{
    f_p = 2;
    up[0] = 0; vp[0] = 0;
    up[1] = 1; vp[1] = 0;
}
/* Region 8 */
else if((uf0 == 0) && (uf1 == 0) && (vf1 == 1))
{
    f_p = 2;
    up[0] = 0; vp[0] = 1;
    up[1] = 1; vp[1] = 1;
}
/* Region 4 */
else if((vf0 == 0) && (vf1 == 0) && (uf0 == 1))
{
    f_p = 2;
    up[0] = 0; vp[0] = 0;
    up[1] = 0; vp[1] = 1;
}
/* Region 6 */
else if ((vf0 == 0) && (vf1 == 0) && (uf1 == 1))
{
    f_p = 2;
    up[0] = 1; vp[0] = 0;
    up[1] = 1; vp[1] = 1;
}
else
{
    DBG_ERR0R ("Invalid texel zone uf0):%d uf1:%d vf0:0/od vf1:%d\n",
                uf0, uf1, vf0; vf1);
}
if(dis_v_fil)
```

APPENDIX A-continued

Software Listing

```
        { vp[0] = 0; vp[1] 32 0; vp[2] = 0; vp[3] = 0;}
        if (dis_u_fil)
        { up[0] = 0; up[1] = 0; up[2]= 0; up[3] = 0;}
        return f_p;
}
Section II
void get_tex_value_rt ()
{
    int v, u, fv, fu;
    int vp[4], up[4];
    unsigned ttr[4], ttg[4], ttb[4], tta[4];
    int tex_mask_local[4];
    int fil_passes, i;
    int frac, u_frac, v_frac
    unsigned. ufvf, as, bs, cs, ds;
    unsigned fra_munge_1, frac_munge_2
    int dr, dg, db;
    unsigned frac_mask;
    int enable_frac_munge;
    int enable_step_frac
    int tex_mask_threshold_encoding;
    int v_pos_a, u_pos_a, v_pos_b, u_pos_b;
    unsigned t_tmr, t_tmg, t_tmb t_tma t_tmm
    int un_norm_um, un_norm_vm, un_norm_uo, un_norm_vo;
    // Mip_mapping variables
    int uv_area;
    int lod = 0;
    int lod_location;
    int lod_x;
    int lod_y;
    int lod_offset;
    int lod_s = 0;
    int lod_location_s;
    int lod_x_s
    int lod_y_s;
    int lod_offset_s;
    int lod_scale;
    if (fil_tex_en)
        {
            frac_mask = frac_mask_table [tex_frac_mask & 0x0f];
            enable_frac_munge = (tex_frac_mask & 0x08)! 1 :0;
            if((tex frac_mask & 0x8) && (tex_frac_mask & 0x10))
                DBG_ERR0R ("Step frac and munging set - Invalid\");
            enable_step_frac = (tex_frac_mask & 0x10)! 1:0;
            tex_mask_threshold_encoding = (tex_frac_mask & 0xff)>>5;
        }
#if 0
            uv_area = calculate_uv_area (un_norm_vm, un_norm_um,
                        un_norm_vo, un_norm_uo,
                        tex_true.upitch,tex_true.vpitch);
        }
        else
#endif
        if(tex_mip_mapping_mode)
            uv_area = calculate_uv_area (delta_v_main, delta_u_main,
                        delta_v_ortho delta_u_ortho,
                        tex_true.upitch,tex_true.vpitch);
        if(!fil_tex_en && !tex_mip_mapping_mode)
        {
            switch (texture_mode)
            {
            case TEXTURE_LINEAR:
                v = (v_pos>>16) & tex_lin.vmask;
                u = (u_pos>>16) & texlin.umask;
            break;
            case TEXTURE_PERSPECTIVE:
                v = (v_pos>>16) & tex_persp.vmask;
                u = (u_pos>>16) & tex_persp.umask;
            break;
            default:
                DBG_ERR0R ("Invalid texture mode\n");
        }
        read_tex_memory (v; u);
        set_tex_color_compare_flags ();
        tex_mask = tex_cc_mask & tex_mask
        tex_cc_mask = tex_mask;
    }
}
```

APPENDIX A-continued

Software Listing

```
else if(fil_tex_en && | tex_mip_mapping_mode)
{
    fil_passes = determine_fil_passes (V_pos, u_pos, frac_mask vp, up);
    switch (texture_*mode)
    {
        case TEXTURE_LINEAR:
            v = (v_pos>>16) & tex_lin.vmask;
            u = (u_pos>>16) & tex_lin.umask;
            if(tex_v_ovf_sat_en)
            {
                if(v == tex_hn.vmask).
                { vp[0] = 0; vp[1] = 0; vp[2] = 0; vp[3] = 0;}
            }
            if(tex_u_ovf_sat_en)
            {
                if(u == tex_lin.umask)
                { up[0] = 0; up[1] = 0; up[2] = 0; up[3] 0;}
            }
        break;
        case TEXTURE_PERSPECTIVE:
            v = (v_pos>>16) & tex_persp.vmask;
            u = (u_pos>>16) & tex_persp.umask;
            if (tex_v_ovf_sat_en)
            {
                if (v == tex_persp.vmask)
                {vp[0]= 0; vp[1] = 0; vp[2] = 0; vp[3] = 0;}
            }
            if(tex_u._ovf_sat_en)
            {
                if(u == tex_persp.umask)
                {up[0] = 0; up[1] = 0; up[2]= 0; up[3] = 0;}
            56
        break;
        default:
            DBG_ERR0R ("Invalid texture mode\n");
    }
// printf("uf0:%d uf1:%d vf0:%d vf1:%d fp:%d";uf0, uf1, vf0, vf1, fil_passes);
    if(fil_passes == 1)
    {
        switch (texture_mode)
        {
            case TEXTURE_LINEAR
                vp[0] = ((v_pos>>16) + vp[0]) & tex_lin.vmask;
                up[0] = ((u_pos>>16) + up[0]) & tex_lin.umask;
            break;
            case TEXTURE_PERSPECTIVE:
                vp[0] = ((v_pos>>16) + vp[0]) & tex_persp.vmask;
                up[0] = ((u_pos>>16) + up[0]) & tex_persp.umask;
            break;
}
        tex_mask = 1;tex._cc_mask = 1;
        read_tex_memory (vp[0], up[0]);
        set_tex_color_compare_flags ();
        tex_mask_local[0] = tex_mask & tex_cc_mask;
        tex_mask = tex_cc_mask = tex_mask_local[0];
    }
    else if(fil_passes == 2)
    {
        switch (texture_mode)
        {
            case TEXTURE_LINEAR:
                for (i=0; i<fil_passes; i++)
                {
                    vp[i] = ((v_pos>>16) + vp[i] & tex_lin.vmask;
                    up[i] ((u_pos>>16) + up[i]) & tex_lin.umask;
                }
            break;
            case TEXTURE_PERSPECTIVE:
                for (i=0; i<fil_passes; i++)
                {
                    vp[i] = ((v_pos>>16) + vp[i]) & tex_persp.vmask;
                    up[i] = ((u_pos>>16) + up[i]) & tex_persp.umask;
                }
            break;
}
        for (i=0; i<fil_passes; i++)
        {
```

APPENDIX A-continued

Software Listing

```
            tex_mask = 1; tex_cc_mask = 1;
            read_tex_memory (vp[i], up[i]);
            set_tex_color_compare_flags ();
            tex_mask_local[i] = tex_mask & tex_cc_mask
            if (tex_mask_local[i])
            {
                ttr[i] = tr_pe;
                ttg[i] = tg_pe;
                ttb[i] = tb_pe;
                tta[i] = ta_pe;
            }
            else
            {
                ttr[i] = 0;
                ttg[i] = 0;
                ttb[i] = 0;
                tta[i] = 0;
            }
        }
        if((um == 0) && (uf1 == 0))
            frac = (u_pos>>8) & 0xff;
        else
            frac = (v_pos>>8) & 0xff;
        if (enable_step_frac)
            frac & = frac_mask
        if (enable_frac_munge)
        {
            // The multiplication by 0xfe is done to match hw
            frac = (((4 * frac) - 0x100)>>1) & 0xfe;
        }
        frac_munge_1 = 0x100 - frac;
        frac_munge_2 = frac;
        // printf("frac:%x sc_2p:%x\", frac sc_2p);
        tr_pe = ((((ttr[0]>>8) * frac_munge_1)>>4) +
            (((ttr[1]>>8) * frac_munge_2)>>4);
        tg_pe = ((((ttg[0]>>8) * frac_munge_1)>>4) +
            (((ttg[1]>>8) * frac_munge_2)>>4);
        tb_pe = ((((ttb[0]>>8) * frac_munge_1)>>4) +
            (((ttb[1]>>8) * frac_munge_2)>>4);
        ta_pe = ((((tta[0]>>8) * frac_munge_1)>>4) +
            (((tta[1]>>8) * frac_munge_2)>>4);
        tr_pe<<= 4;
        tg_pe<<= 4;
        tb_pe<<= 4;
        ta_pe<<= 4;
        tex_mask = (tex_mask_local[0] * frac_munge_1) +
            (tex_mask_local[1] * frac_munge_2);
        tex_cc_mask = decode_tex_mask (tex_mask_threshold_encoding, tex_mask);
        tex_mask = tex_cc_mask;
    }
    else if(fil_passes == 4)
    {
    tswitch (texture_mode)
    {
            case TEXTURE_LINEAR:
                for (i = 0, i<fil_passes; i++)
                {
                    vp[i] = ((v_pos>>16) + vp[i]) & tex_lin.vmask;
                    up[i] = ((u_pos>>16) + up[i]) & tex_lin.umask;
                }
            break;
            case TEXTURE_PERSPECTIVE:
                for (i=0; i<fil_passes; i++)
                {
                    vp[i] = ((v_pos>>16) + vp[i]) & tex_persp.vmask;
                    up[i] = ((u_pos>>16) + up[i]) & tex_persp.umask;
                }
            break;
    }
        for (i=0; i<fil_passes; i++)
        {
            tex_mask = 1; tex_cc._mask = 1;
            read_tex_memory (vp[i], up[i]);
            set_tex_color_compare_flags ();
            tex_mask_local[i] = tex_mask & tex_cc_mask;
            if(tex_mask_local[i])
            {
```

APPENDIX A-continued

Software Listing

```
                ttr[i] = tr_pe;
                ttg[i] = tg_pe;
                ttb[i] = tb_pe;
                tta[i] = ta_pe;
            }
            else
            {
                ttr[i] = 0;
                ttg[i] = 0;
                ttb[i] = 0;
                tta[i] = 0;
            }
        }
        u_frac = (u_pos>>8) & 0xff;
        v_frac = (v_pos>>8) & 0xff;
        if (enable_frac_munge)
        {
            // The multiplication by 0xfe is done to match hw
            u_frac = (((4 * u_frac) - 0x100)>>1) & 0xfe;
            v_frac = (((4 * v_frac) - 0x100)>>1) & 0xfe;
        }
        if (enable_step_frac)
        {
            u_frac &= ~frac_mask
            v_frac &= ~frac_mask
        }
        ufvf = ((u_frac * v_frac)>>8) & 0xff;
        as = (0x100 - u_frac) - v_frac + ufvf;
        bs = u_frac-ufvf;
        cs = v_frac-ufvf;
        ds = ufrf;
        tr_pe = (((ffr[0]>>8) * as)>>4) +
                (((ttr[i]>>8) * bs)>>4) +
                (((ttr[2]>>8) * cs)>>4) +
                (((ttr[3]>>8) * ds)>>4);
        tg_pe = (((ttg[0]>>8) * as)>>4) +
                (((ttg[1]>>8) * bs)>>4) +
                (((ttg[2]>>8) * cs)>>4) +
                (((ttg[3]>>8) * ds)>>4);
        tb_pe = (((ttb[0]>>8) * as)>>4)+
                (((ttb[1]>>8) * bs)>>4) +
                (((ttb[2]>>8) * cs)>>4) +
                (((ttb[3]>>8) * ds)>>4);
        ta_pe = (((tta[0]>>8) * as)>>4) +
                (((tta[1]>>8) * bs)>>4) +
                (((tta[2]>>8) * cs)>>4) +
                (((tta[3]>>8) * ds) >>4);
        tr_pe<<= 4;
        tg_pe<<= 4;
        tb_pe<<= 4;
        ta_pe<<= 4;
        tex_mask = (tex_mask_local[0] * as) +
                   (tex_mask_local[1] * bs) +
                   (tex_mask_local[2] * cs) +
                   (tex_mask_local[3] * ds);
        tex_cc_mask = decode_tex_mask (tex_mask_threshold_encoding, tex_mask);
        tex_mask = tex_cc_mask
    }
}
```

We claim:

1. A texture mapping method for determining a texel value to be applied to a pixel on a computer screen, said applied texel value derived from one or more texels from a texture map in which texels are referenced by a multi-bit digital u coordinate and a multi-bit digital v coordinate, said method comprising the steps of:

determining a u,v coordinate in the texture map, said u,v coordinate including an integer portion and a fractional portion and said texture map being divided into a plurality of regions, each of the plurality of regions defined by predetermined distance boundaries from nearest adjacent texels;

determining in which region said u,v coordinate is located; and implementing one of a plurality of different preselected filtering techniques to derive said applied texel value, the selected filtering technique being selected in response to which region said u,v coordinate is located.

2. The texture mapping method of claim 1, wherein said step of determining in which region said u,v coordinate is located further comprises the step of setting at least one flag depending upon which region said u,v coordinate is located.

3. The texture mapping method of claim 2, wherein said step of setting at least one flag depending on which region said u,v coordinate is located further comprises the step of setting four flags depending upon which region said u,v coordinate is located.

4. The texture mapping method of claim 3, wherein said step of setting four flags depending upon which region said u,v coordinate is located further comprises the step of setting two u coordinate flags and two v coordinate flags.

5. The texture mapping method of claim 4, wherein the two u coordinate flags include uf0 and uf1 and the two v coordinate flags include vf0 and vf1 and said step of determining in which region said u,v coordinate is located further comprises the steps of:

setting the uf0 flag to a value of 1 if the most significant n bits of a fractional portion of said u coordinate are all 0, and setting the uf0 flag to a value of 0 otherwise.

6. The texture mapping method of claim 5, wherein said step of determining in which region said u,v coordinate is located further comprises the steps of:

setting the vf0 flag to a value of 1 if the most significant m bits of a fractional portion of said v coordinate are all 0, and setting the vf0 flag to a value of 0 otherwise.

7. The texture mapping method of claim 6, wherein said step of determining in which region said u,v coordinate is located further comprises the steps of:

setting the uf1 flag to a value of 1 if the most significant n bits of a fractional portion of said u coordinate are all 1, and setting the uf1 flag to a value of 0 otherwise.

8. The texture mapping method of claim 7, wherein said step of determining in which region said u,v coordinate is located further comprises the steps of:

setting the vf1 flag to a value of 1 if the most significant m bits of a fractional portion of said v coordinate are all 1, and setting the vf1 flag to a value of 0 otherwise.

9. The texture mapping method of claim 8, wherein said step of determining in which region said u,v coordinate is located further comprises the step of:

shifting said u and v coordinates by a predetermined number p positions to the right.

10. The texture mapping method of claim 9, wherein said step of determining in which region said u,v coordinate is located further comprises the step of:

computing uf0 initially as the shifted u coordinate locally ANDed with a logical inverse of a mask value and then ANDed with a value FFh.

11. The texture mapping method of claim 10, wherein said step of determining in which region said u,v coordinate is located further comprises the steps of:

redefining the uf0 flag to be a value of 1 if all of said bits of the shifted u coordinate ANDed with the mask value and FFh are 0; and redefining the uf0 flag to be a value of 0 otherwise.

12. The texture mapping method of claim 11, wherein said step of determining in which region said u,v coordinate is located further comprises the step of:

computing vf0 initially as the shifted v coordinate locally ANDed with a logical inverse of a mask value and then ANDed with a value FFh.

13. The texture mapping method of claim 12, wherein said step of determining in which region said u,v coordinate is located further comprises the steps of:

redefining the vf0 flag to be a value of 1 if all of said bits of the shifted v coordinate ANDed with the mask value and FFh are 0; and redefining the vf0 flag to be a value of 0 otherwise.

14. The texture mapping method of claim 13, wherein said step of determining in which region said u,v coordinate is located further comprises the step of:

computing uf0 initially as the shifted u coordinate locally ANDed with a logical inverse of a mask value and then ANDed with a value FFh.

15. The texture mapping method of claim 14, wherein said step of determining in which region said u,v coordinate is located further comprises the steps of:

redefining the uf1 flag to be a value of 1 if all of said bits of the shifted u coordinate ANDed with the mask value and FFh are 1; and redefining the uf1 flag to be a value of 0 otherwise.

16. The texture mapping method of claim 15, wherein said step of determining in which region said u,v coordinate is located further comprises the step of:

computing vf1 initially as the shifted v coordinate locally ANDed with a logical inverse of a mask value and then ANDed with a value FFh.

17. The texture mapping method of claim 16, wherein said step of determining in which region said u,v coordinate is located further comprises the steps of:

redefining the vf1 flag to be a value of 1 if all of said bits of the shifted v coordinate ANDed with the mask value and FFh are 1; and redefining the vf1 flag to be a value of 0 otherwise.

18. The texture mapping method of claim 8, wherein said step of implementing one of a plurality of different preselected filtering techniques to derive said applied texel value, the selected filtering technique being selected in response to which region said u,v coordinate is located further comprises the step of:

implementing a four-texel averaging filter if uf0=uf1=vf0=vf1=0.

19. The texture mapping method of claim 8, wherein said step of implementing one of a plurality of different preselected filtering techniques to derive said applied texel value, the selected filtering technique being selected in response to which region said u,v coordinate is located further comprises the step of:

implementing a two-texel averaging filter if uf0=uf1=0.

20. The texture mapping method of claim 8, wherein said step of implementing one of a plurality of different preselected filtering techniques to derive said applied texel value, the selected filtering technique being selected in response to which region said u,v coordinate is located further comprises the step of:

implementing point sampling in which a single texel value from said texture map is applied to said pixel if uf0=vf1=1.

21. The texture mapping method of claim 20, wherein said step of implementing one of a plurality of different preselected filtering techniques to derive said applied texel value, the selected filtering technique being selected in response to which region said u,v coordinate is located further comprises the step of:

implementing point sampling in which a single texel value from said texture map is applied to said pixel if uf1=vf0=1.

22. The texture mapping method of claim 21 wherein step (c) includes implementing point sampling if uf1=vf0=1.

23. A computer readable storage medium for storing an executable set of software instructions which, when executed on a host computer system, are capable of controlling the operation of the host computer, said software instructions being operable to determine a texel value to be applied to a pixel on a computer screen, said applied texel value derived from one or more texels from a texture map in which texels are referenced by a multi-bit digital u coordinate and a multi-bit digital v coordinate, said computer readable storage medium storing an executable set of software instructions comprising:

an instruction for determining a u,v coordinate in the texture map, said u,v coordinate including an integer portion and a fractional portion and said texture map being divided into a plurality of regions, each of the plurality of regions defined by predetermined distance boundaries from nearest adjacent texels;

an instruction for determining in which region said u,v coordinate is located; and an instruction for implementing one of a plurality of different preselected filtering techniques to derive said applied texel value, the selected filtering technique being selected in response to which region said u,v coordinate is located.

24. The computer readable storage medium for storing an executable set of software instructions of claim 23, wherein said instruction for determining in which region said u,v coordinate is located further comprises an instruction for setting at least one flag depending upon which region said u,v coordinate is located.

25. The computer readable storage medium for storing an executable set of software instructions of claim 24, wherein said instruction for setting at least one flag depending on which region said u,v coordinate is located further comprises an instruction for setting four flags depending upon which region said u,v coordinate is located.

26. The computer readable storage medium for storing an executable set for software instructions of claim 25, wherein said instruction for setting four flags depending upon which region said u,v coordinate is located further comprises an instruction for setting two u coordinate flags and two v coordinate flags.

27. The computer readable storage medium for storing an executable set for software instructions of claim 26, wherein the two u coordinate flags include uf0 and uf1 and the two v coordinate flags include vf0 and vf1 and said instruction for determining in which region said u,v coordinate is located further comprises:

an instruction for setting the uf0 flag to a value for 1 if the most significant n bits for a fractional portion for said u coordinate are all 0, and an instruction for setting the uf0 flag to a value of 0 otherwise.

28. The computer readable storage medium for storing an executable set for software instructions of claim 27, wherein said instruction for determining in which region said u,v coordinate is located further comprises:

an instruction for setting the vf0 flag to a value of 1 if the most significant m bits for a fractional portion for said v coordinate are all 0, and an instruction for setting the vf0 flag to a value of 0 otherwise.

29. The computer readable storage medium for storing an executable set for software instructions of claim 28, wherein said instruction for determining in which region said u,v coordinate is located further comprises:

an instruction for setting the uf1 flag to a value of 1 if the most significant n bits for a fractional portion for said u coordinate are all 1, and an instruction for setting the uf1 flag to a value of 0 otherwise.

30. The computer readable storage medium for storing an executable set for software instructions of claim 29, wherein said instruction for determining in which region said u,v coordinate is located further comprises:

an instruction for setting the vf1 flag to a value of 1 if the most significant m bits for a fractional portion for said v coordinate are all 1, and an instruction for setting the vf1 flag to a value of 0 otherwise.

31. The computer readable storage medium for storing an executable set for software instructions of claim 30, wherein said instruction for determining in which region said u,v coordinate is located further comprises:

an instruction for shifting said u and v coordinates by a predetermined number p positions to the right.

32. The computer readable storage medium for storing an executable set for software instructions of claim 31, wherein said instruction for setting the uf0 flag further comprises:

an instruction for computing uf0 initially as the shifted u coordinate locally ANDed with a logical inverse for a mask value and then ANDed with a value FFh.

33. The computer readable storage medium for storing an executable set for software instructions of claim 32, wherein said instruction for setting the uf0 flag further comprises:

an instruction for redefining the uf0 flag to be a value of 1 if all for said bits for the shifted u coordinate ANDed with the mask value and FFh are 0; and an instruction for redefining the uf0 flag to be a value of 0 otherwise.

34. The computer readable storage medium for storing an executable set for software instructions of claim 33, wherein said instruction for setting the vf0 flag further comprises:

an instruction for computing vf0 initially as the shifted v coordinate locally ANDed with a logical inverse for a mask value and then ANDed with a value FFh.

35. The computer readable storage medium for storing an executable set for software instructions of claim 34, wherein said instruction for setting the vf0 flag further comprises:

an instruction for redefining the vf0 flag to be a value of 1 if all for said bits for the shifted v coordinate ANDed with the mask value and FFh are 0; and an instruction for redefining the vf0 flag to be a value of 0 otherwise.

36. The computer readable storage medium for storing an executable set for software instructions of claim 35, wherein said instruction for setting the uf1 flag further comprises:

an instruction for computing uf1 initially as the shifted u coordinate locally ANDed with a logical inverse for a mask value and then ANDed with a value FFh.

37. The computer readable storage medium for storing an executable set for software instructions of claim 36, wherein said instruction for setting the uf1 flag further comprises:

an instruction for redefining the uf1 flag to be a value of 1 if all for said bits for the shifted u coordinate ANDed with the mask value and FFh are 1; and an instruction for redefining the uf1 flag to be a value of 0 otherwise.

38. The computer readable storage medium for storing an executable set for software instructions of claim 31, wherein said instruction for setting the vf1 flag further comprises:

an instruction for computing vf1 initially as the shifted v coordinate locally ANDed with a logical inverse for a mask value and then ANDed with a value FFh.

39. The computer readable storage medium for storing an executable set for software instructions of claim 38, wherein said instruction for setting the vf1 flag further comprises:

an instruction for redefining the vf1 flag to be a value of 1 if all for said bits for the shifted v coordinate ANDed with the mask value and FFh are 1; and an instruction for redefining the vf1 flag to be a value of 0 otherwise.

40. The computer readable storage medium for storing an executable set for software instructions of claim 30, wherein said instruction for implementing one of a plurality of different preselected filtering techniques to derive said applied texel value, the selected filtering technique being selected in response to which region said u,v coordinate is located further comprises:

an instruction for implementing a four-texel averaging filter if uf0=uf1=vf0=vf1=0.

41. The computer readable storage medium for storing an executable set for software instructions of claim 30, wherein said instruction for implementing one of a plurality of different preselected filtering techniques to derive said applied texel value, the selected filtering technique being selected in response to which region said u,v coordinate is located further comprises:

an instruction for implementing a two-texel averaging filter if uf0=uf1=0.

42. The computer readable storage medium for storing an executable set for software instructions of claim 30, wherein said instruction for implementing one of a plurality of different preselected filtering techniques to derive said applied texel value, the selected filtering technique being selected in response to which region said u,v coordinate is located further comprises:

an instruction for implementing a two-texel averaging filter if vf0=vf1=0.

43. The computer readable storage medium for storing an executable set for software instructions of claim 30, wherein said instruction for implementing one of a plurality of different preselected filtering techniques to derive said applied texel value, the selected filtering technique being selected in response to which region said u,v coordinate is located further comprises:

an instruction for implementing point sampling in which a single texel value from said texture map is applied to said pixel if uf0=vf1=1.

44. The computer readable storage medium for storing an executable set for software instructions of claim 43, wherein said instruction for implementing one of a plurality of different preselected filtering techniques to derive said applied texel value, the selected filtering technique being selected in response to which region said u,v coordinate is located further comprises:

an instruction for implementing point sampling in which a single texel value from said texture map is applied to said pixel if uf1=vf0=1.

45. A method of texture mapping for determining a texel value to be applied to an x,y pixel on a computer screen, said applied texel value derived from one or more texels from a texture map, said method comprising the steps of:

determining a u,v coordinate of the pixel relative to the texture map, if the u,v coordinate is located within a predetermined distance of only one texel, selecting a point sampling scheme using the closest texel to render the x,y pixel, if the u,v coordinate is located within a predetermined distance of two texels, but greater than another predetermined distance from all other texels, combining the two closest texels using a two-texel averaging filter, and if the u,v coordinate is located within a predetermined distance of four texels, combining the four closest texels using a four-texel averaging filter.

46. A method of texture mapping method for determining a texel value to be applied to an x,y pixel on a computer screen, said applied texel value derived from one or more texels from a texture map, said method comprising the steps of:

determining a u,v coordinate of the pixel relative to the texture map, determining distance of the u,v coordinate of the pixel to the nearest texels in the texture map, and selecting a texel filtering technique from a predetermined number of texel filtering techniques based upon the distance of the u,v coordinate of the pixel to the nearest texels in the texture map.

* * * * *